(12) United States Patent
Hart et al.

(10) Patent No.: US 10,050,838 B1
(45) Date of Patent: Aug. 14, 2018

(54) SELF-ORGANIZING TOPOLOGY MANAGEMENT

(71) Applicant: Google LLC, Mountain View, CA (US)

(72) Inventors: Michael John Hart, Seattle, WA (US); Peter Gelbman, Bothell, WA (US)

(73) Assignee: Google LLC, Mountain View, CA (US)

( * ) Notice: Subject to any disclaimer, the term of this patent is extended or adjusted under 35 U.S.C. 154(b) by 197 days.

(21) Appl. No.: 14/120,834

(22) Filed: Jul. 1, 2014

Related U.S. Application Data

(60) Provisional application No. 61/841,170, filed on Jun. 28, 2013.

(51) Int. Cl.
*H04L 12/24* (2006.01)
*H04W 28/02* (2009.01)
*H04W 40/24* (2009.01)
*H04L 12/751* (2013.01)

(52) U.S. Cl.
CPC .......... *H04L 41/12* (2013.01); *H04L 41/0668* (2013.01); *H04L 45/02* (2013.01); *H04W 28/021* (2013.01); *H04W 40/24* (2013.01)

(58) Field of Classification Search
CPC ... H04L 41/0826; H04L 4/0896; H04L 45/22; H04L 12/185; H04L 12/189; H04L 41/12; H04L 41/0668; H04L 45/02; H04W 28/021; H04W 40/24
See application file for complete search history.

(56) References Cited

U.S. PATENT DOCUMENTS

| 5,870,605 | A | 2/1999 | Bracho et al. | |
| 7,756,041 | B2 | 7/2010 | Whitehill et al. | |
| 8,103,789 | B1* | 1/2012 | Gan | G06F 11/1464 370/242 |
| 2006/0095815 | A1* | 5/2006 | Noy | H04L 41/12 714/712 |
| 2009/0201844 | A1* | 8/2009 | Bhatti | H04L 12/185 370/312 |

* cited by examiner

*Primary Examiner* — Walter Divito
*Assistant Examiner* — Anthony Luo
(74) *Attorney, Agent, or Firm* — Lerner, David, Littenberg, Krumholz & Mentlik, LLP

(57) ABSTRACT

Systems and methods, including procedures, for managing wireless point-to-multipoint networks supporting dynamic topologies with relaying, multi-hop or wireless bridging. A topology management protocol is embedded in a wireless MAC layer in a multi-hop point-to-multipoint network, enabling self-organizing dynamic topology management by using link level information to make decisions for relaying data. The topology management protocol provides for a first node to establish primary and alternate associations with other nodes based on a hub path cost associated with each of the other nodes.

24 Claims, 23 Drawing Sheets

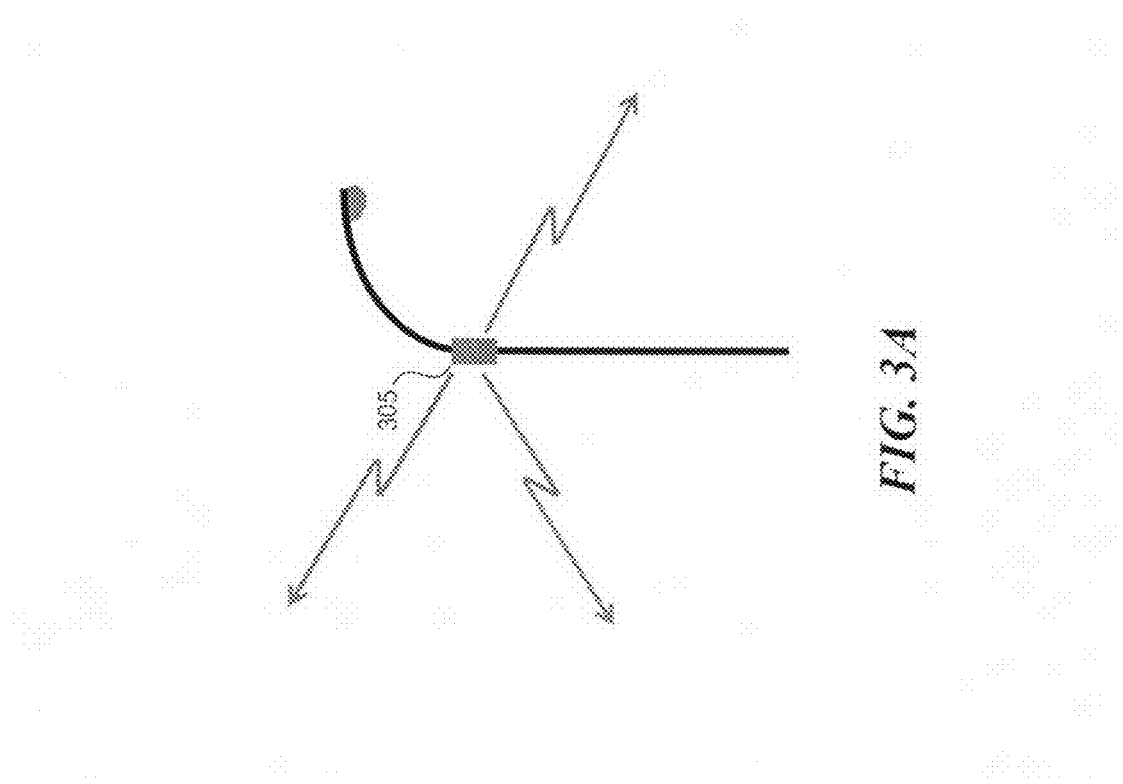

SELF-ORGANIZING TOPOLOGY MANAGEMENT

CROSS-REFERENCE TO RELATED APPLICATION(S)

The present application claims priority to and the benefit of U.S. Provisional Patent Application No. 61/841,170, filed Jun. 28, 2013, entitled "SELF-ORGANIZING TOPOLOGY MANAGEMENT PROCEDURES, IMPLEMENTED IN FOR, FOR EXAMPLE, MILLIMETER-WAVE MULTI-HOP POINT-TO-MULTIPOINT NETWORK NODES." The disclosure of the above-listed application is hereby incorporated by reference in its entirety.

BACKGROUND

Rapid Spanning Tree Protocol (RSTP) supports the efficient formation and adaption of active tree topologies in a wired local area network (LAN) where multiple connections between nodes exist. Essentially, the protocol operates on a network that is a dynamic mesh of physical links to reliably form a structured tree of active forwarding links.

Traditionally, in wireless transport networks, links are planned before they are deployed. This is because topologies such as these are known ahead of time and are relatively stable, or at least changes can be controlled. An exception to this is when equipment failure occurs or a radio link become unviable (e.g., a path is blocked). To manage scenarios like these, resilience is typically designed into the topology using, for example, rings or redundant paths, and fail-over protocols are used to utilize a known (pre-planned) alternate path. Some of the protocols for Ethernet networks using wireless point-to-point links to connect bridges include Provider Backbone Bridge Traffic Engineering (PBB-TE), RSTP, and G.8032.

A different protocol is needed for wireless point-to-multipoint networks supporting dynamic topologies with relaying, multi-hop or wireless bridging. Topologies in these networks are dynamic, and nodes may be rapidly lost or discovered, making conventional network topology management inefficient.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 3A-3C are diagrams showing how modules can be implemented and used to form various types of nodes for providing wireless backhaul transport.

DETAILED DESCRIPTION

1. Introduction

Figure 1:
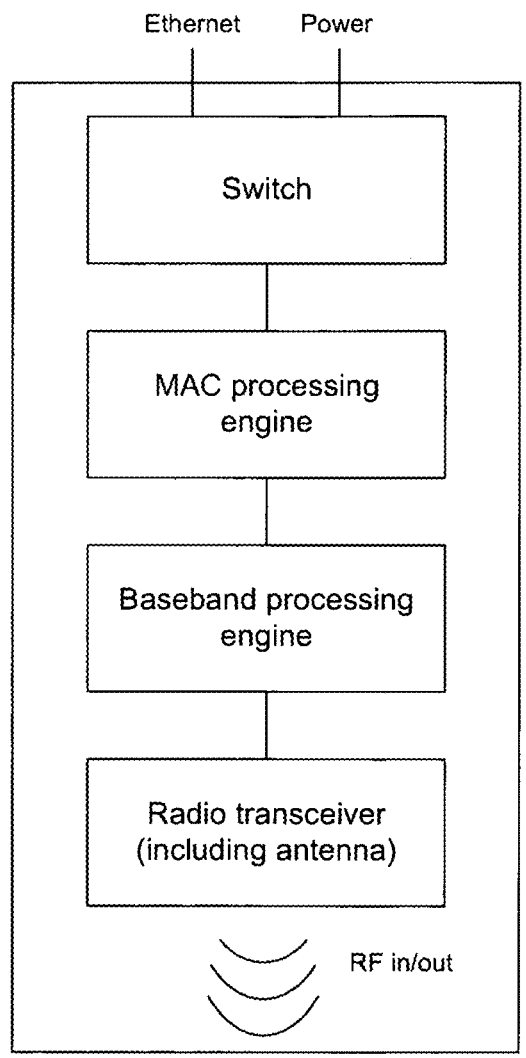
FIG. 1 is a block diagram of a module for providing wireless backhaul transport.

Systems and methods, including procedures, are disclosed herein detailing a new approach for managing wireless point-to-multipoint networks supporting dynamic topologies with relaying, multi-hop or wireless bridging. To manage the topology of these networks, a topology management protocol can be embedded in the wireless MAC layer rather than being implemented using a hierarchical approach that detaches the transportation of packets over a link and the management of links to use to form an active network. In the case of multi-hop networks, the MAC layer controlling the links also can determine how to best utilize the available paths and what associations to form with other nodes in the network. It can because it has intimate knowledge of link status. As a result, decision making can be located within this layer for ultimate efficiency.

In summary, embedding topology management and forwarding (or bridging) into the wireless MAC layer in a multi-hop point-to-multipoint network enables self-organizing dynamic topology management by using link level information to make decisions. It also enables very efficient frame forwarding, as there is the potential for this to happen in the lower sub-layers of the wireless MAC layer where frame-by-frame decisions can be made based on link status.

1.1 Terminology

The following terminology is used throughout this document and may be understood to have the following meanings. These meanings are provided for clarity and are not intended to be limiting.

Hub: A node where connection to a Wide Area Network (WAN) (e.g., a fiber connection) is available Hub path: An active communication path between a node and a hub, spanning at least one other node Hub path cost: Metric quantifying a cost for accessing a hub through a particular node in the network (i.e., a cost for using a particular hub path), or, in reference to a hub path cost for a hub node, a cost for accessing a WAN or service through the hub node Primary association: An association used by a node to actively transfer data frames to the network and WAN Alternate association: An association that is effectively in standby mode, and actively maintained, to provide an alternative to the primary association, should the primary fail

1.2 Comparison to 802.16j

Multi-hop topology management has been considered in another point-to-multipoint wireless system, the IEEE 802.16 standard through the features introduced in the 802.16j amendment. 802.16j discusses how a first node forms an association with a preferred "superordinate" node based on certain criteria. To manage topology change, the nodes operate under a protocol adapted from a general handover procedure such that the relay node or its superordinate node may trigger the handover process based on certain criteria (e.g., physical link status, capacity, latency, etc.).

This procedure is suitable for a system that supports cellular-like handover procedures and those in which links are more likely to gracefully degrade such that a handover can be affected prior to the link becoming unusable. However, systems operating in the millimeter wave bands under line-of-sight conditions using highly directional antennas can rapidly lose links. As a result, handover-like procedures in these systems would not be a good design choice.

A system according to the present disclosure establishes alternate associations so that when a link is lost, connectivity can be rapidly recovered. This system will have much lower "fail-over" time and reduced packet loss (potentially zero with a small amount of buffering), compared to a similar system that adopted handover-type approaches.

As a result, the present disclosure proposes a fresh approach to designing a self-organizing topology management protocol which can be implemented, for example, in a system with beamforming capability operating in millimeter wave bands in line-of-sight conditions that is providing resilient, low latency, and high bandwidth connectivity.

The present disclosure discusses a topology management protocol that can be embedded into a wireless MAC layer. The wireless MAC layer may be based on IEEE 802.11ad, or some other similar MAC protocol, for the purposes of supporting highly efficient layer-2 multi-hop networks to be constructed and the topology of the networks to be efficiently maintained.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

1.3 System Description

As noted above, the radio transceiver under an aspect of the invention includes an integrated antenna, in a SiP, including an AiP, format. The antenna may be configured to allow the focusing of the energy associated with a transmission in a particular direction (beam direction), such as to improve the resilience of the link in the form of an overall increase in the signal to noise plus interference ratio.

FIG. 1 depicts the overall architecture of a wireless communication transceiver module that converts Ethernet frames to a beamformed radio signal, such as a 60 GHz beamformed radio signal, and a beamformed radio signal to Ethernet frames. The wireless communication transceiver module includes a layer 2 packet processing function (PPF), which may incorporate a bridging or switching function, a MAC processing engine, a baseband processing engine, and a radio transceiver. On the transmit side, the module receives Ethernet frames from the host node in which it is embedded, or from another module or host node to which it is connected. In addition the power for the module may be supplied using power over Ethernet or an alternative source in the case that power over Ethernet is not supported by the host node. The PPF translates Ethernet frames to the frame format used at the MAC sub-layer. In addition, the PPF may buffer frames and perform quality of service (QoS) queuing/dequeuing functions, may apply frame filtering, and may perform frame header operations such as manipulating marking or tags of specific frames. The MAC processing engine controls access to the physical wireless medium, which may be either a point-to-point (1 to 1) or point-to-multi-point (1 to many) communication channel. The baseband processing engine provides physical layer functionality, converting MAC frames into a baseband signal. The baseband processing engine also controls the mode of operation of the radio transceiver, which includes at least one antenna and a radio frequency integrated circuit (RFIC). Typically, the baseband processing engine converts the transmitted signal into an analog signal that is provided to the RFIC. In addition, it controls the operation of the RFIC over a digital interface. In particular, the baseband processing engine configures the transmit antenna settings so that they are appropriate for each frame transmitted. The reverse operation is supported on the receive side. Further details regarding elements of the wireless communication transceiver module are provided herein.

Figure 2:
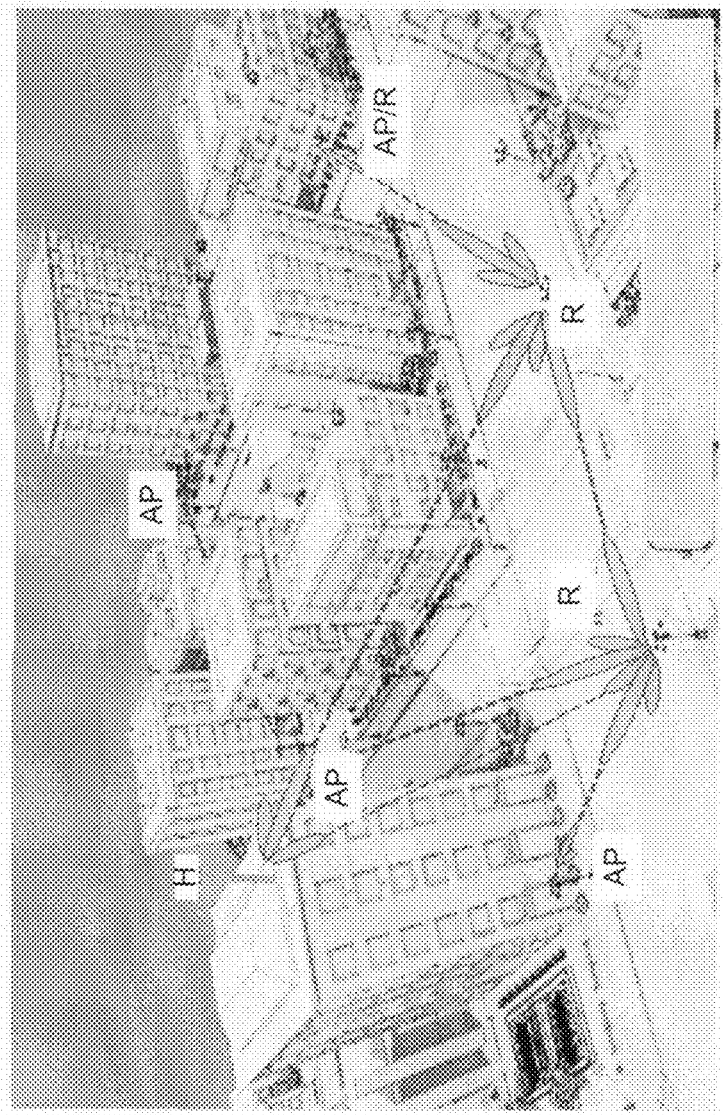
FIG. 2 is a diagram showing a deployment of nodes that contain modules within a city block for providing wireless backhaul transport.

FIG. 2 depicts the different ways in which different node types containing one or more hardware modules are used to provide the overall solution to the problem. Hub nodes 'H', backhaul relay nodes 'R', and access points (4G/5G) 'AP' are distributed and effectively share a Fiber POP at the hub node via 60 GHz line of sight (LOS) connections in an adaptive, self-organizing LOS multi-hop relay architecture between hub nodes, backhaul relay nodes, and access points. Modules are embedded in APs and any form of "street furniture," including light poles, signs bus stops, building structures, and so forth. FIGS. 3A-J depict how modules may be integrated to form different node types, including specific details of the operation of the modules to provide relaying functionality within a multi-hop point-to-multi-point or multi-hop mesh network. FIG. 4 shows some benefits of using multi-hop communication in either a point-to-multi-point or mesh topology for providing a wireless backhaul transport. Some of these benefits include lower cost/GB (e.g., many APs share GbE or 10 GbE fiber POP, and fiber capacity is "spread" over wider area), deployment flexibility (e.g., no topology planning required, and network can adapt when new APs are added), and greater network resilience (e.g., multiple paths to fiber possible, and network hardened to link failure/congestion). Furthermore, more APs can be connected to a fiber POP, which lowers cost per GB. The chart in FIG. 4 shows cost per GB and bitrate per AP (Mbps) vs. APs per GbE fiber pop. The line to which the arrow is pointing indicates cost per GB, the line below that line indicates worst case bit rates per AP, while the dashed line indicates best cast bit rate per AP. The diagram below the chart shows that multi-hop enables access points geographically separated to be connected. Furthermore, multi-hop enables sites to have multiple routes to fiber. In FIG. 4, a schematic drawing of a map 405 shows a scenario in which multi-hop enables multiple APs to be connected. APs are represented by stars and circles, and hubs are represented by lightning bolts. APs are connected via 60 GHz LOS connections to other APs. Without multi-hop, a geographically isolated AP that lost its link from a hub would be stranded. For example, if the link between AP10 and AP11 were lost, AP11 would be stranded without multi-hop.

FIG. 3A shows an example of one or more of the wireless communication transceiver modules of FIG. 1 incorporated into a wireless node 305, such as a hub or relay station (HS or RS), or as an access point (AP), base station or endpoint station. The node 305 is shown mounted on a light pole that may be positioned, e.g., over a street. The node of FIG. 3A may include an integrated panel array antenna with ~+/−60 deg steerable beam coverage in azimuth, and ~+/−45 deg steerable beam coverage in elevation. The node may employ Power-over-Ethernet input, and produce 60 GHz beam-formed output.

As a hub or relay station in a multi-hop point-to-multipoint or multi-hop mesh network topology, the node may incorporate 2, 3 or 4 modules combined to provide up to complete 360 deg coverage (e.g. at intersection 4 radios cover north, east, south, west directions). For a hub, if each link is at 1 Gbps, then the hub provides up to 4 Gbps capacity. Hub is the point of connection to fiber, or other backhaul mechanism behind the 60 GHz multi-hop point-to-multipoint or multi-hop mesh network.

Furthermore, the hub or relay station may be a standalone unit that is mounted on to an existing structure (e.g. a light pole, face of a building, behind a sign, at a bus or train stop, etc), or it could itself be embedded within that structure. For example a light pole could integrate 1 or more modules, and provide PoE to the module (as shown in FIG. 3A). The light pole with integrated module would then present an integrated interface port (e.g. Ethernet port) such that any node that required a connection to a wider area network could be affixed to the light pole to not just gain power and a location to be mounted, but to also gain connectivity to a communication network. One such example of use of a "networked light pole" would be where a security camera could be mounted and connected to the Ethernet port on the pole. The "networked light pole" provides a physical mounting point, power and also connectivity of the security camera to a security network enabling the transmission of video frames to a centralized control center, and a means for the control center to control the camera. This example is intended to describe one such application that could be enabled by embedded modules into various types of "street-level furniture", and there are many others that can be envisaged if the module is embedded into advertising signs, traffic signs, bus stops, train stops etc. In addition, not only do the pieces of street furniture gain the ability to provide access to a communication network to other units mounted on to them, but the modules embedded within them can connect together to form a multi-hop and/or mesh transport network to assist in connecting other "networked street-furniture" elements together.

As an AP, basestation or endpoint station, the node may incorporate a minimum of 1 wireless communication transceiver module integrated with into a non-hub or RS station. In this case only coarse alignment is needed—point in either north, east, south or west direction towards a hub or RS. Installation can be further simplified by increasing number of modules.

Figure 3B:
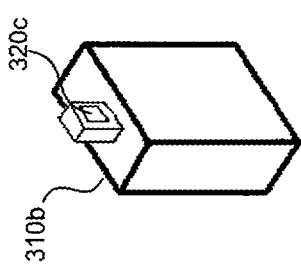
Figure 3B:
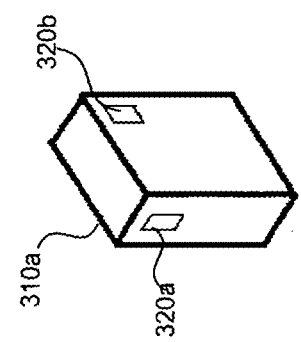
Figure 3C:
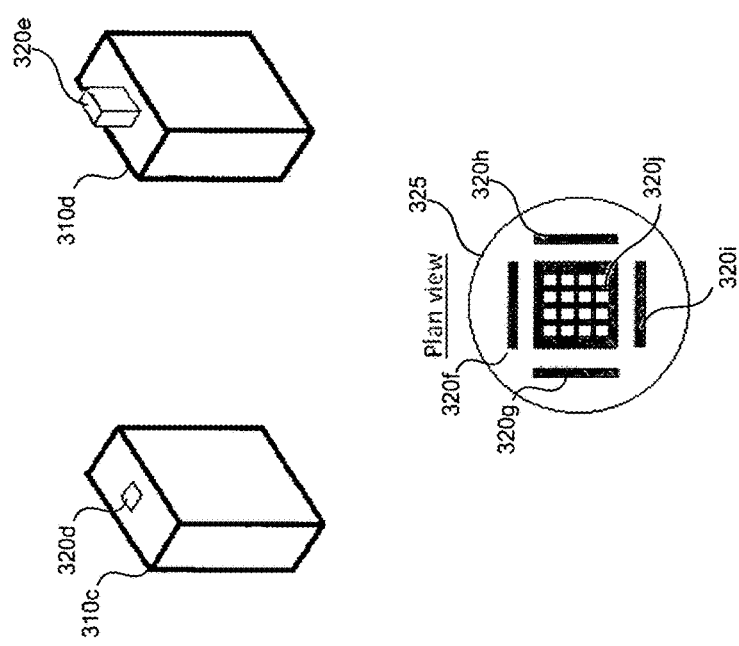
Figure 4:
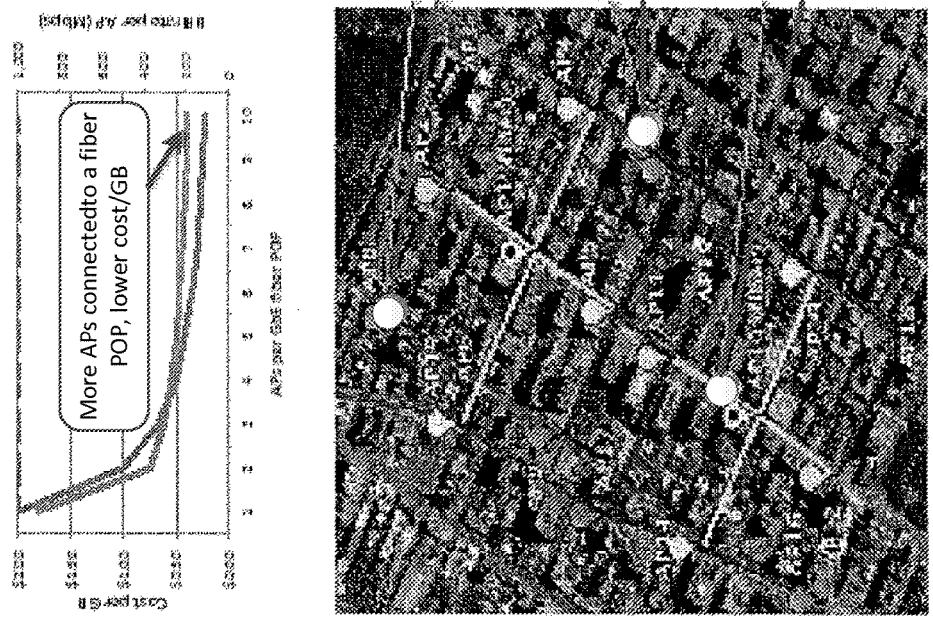
FIG. 4 is a diagram describing some benefits of using multi-hop communication for providing a wireless backhaul transport.

FIGS. 3B and 3C show use of one or more wireless communication transceiver ("modules") integrated with the AP or other node, e.g. embedded inside the AP case or shroud surrounding the AP, and pluggable and connects to the AP in an integrated way (e.g. weatherized power-over-Ethernet connector). FIG. 3B shows an access point 310a that includes embedded modules 320a-b, which are integrated into different faces of the AP, which enables coverage in multiple directions (e.g., north, east, south, and west). Another access point 310b includes a pluggable module 320c. A pluggable module may also be the basis for a relay station with multiple interconnected modules and a hub station with multiple modules connected to a wired or backhaul connection (e.g., a fiber switch). In some implementations, a module is mounted in an enclosure or shroud behind a "transparent" window (i.e., a polymer that is essentially transparent to 60 GHz waves). Each module may provide of the order of +/−45 degrees vertical coverage. FIG. 3C shows access points 310c and 310d with modules 320d-e mounted facing up, enabling effective +/−135 degree coverage and easier connection to a roof-top hub for a unit located at street level. Upward facing modules may be integrated with a GPS antenna configured to communicate with satellites for timing and synchronization.

One implementation shown in Plan view in FIG. 3C includes four vertically orientated modules 320f-i, and one horizontal module 320j as shown. This implementation includes a horizontal module that may incorporate GPS receive functionality. All five modules can be incorporated into a "dome" 325 similar to that used for GPS receivers, including an outer shroud that would be transparent at 60 GHz. The node may be backhaul capable pluggable unit that replaces the GPS dome typically installed on the top of access points, or can be added in addition in a similar manner.

Referring back to FIG. 1, the baseband processing engine is capable of generating wideband analog I/O (in-phase and quadrature phase) signals for modulation to the radio frequency carrier by the radio transceiver, as well as configuring parameters associated with the radio transceiver that control the beam direction. The baseband engine is capable of taking digitized information signals on the order of Gbps and transposing them to an analog IQ signal of 1 GHz or greater bandwidth. In addition, the baseband engine may dynamically reduce available data rate in order to increase the system gain (e.g. by reducing the bandwidth used to reduce the noise in the system, or maintaining the wide bandwidth but increasing the coding overhead, thereby increasing the "processing gain"). Increasing the system gain equates to increasing the tolerable propagation loss between a transmitter and receiver, hence improving the robustness of a link enabling either an increase in range or resiliency to a link degrading event, such as rain, that causes an increase in the signal attenuation between a transmitter and receiver. From a protocol layer point of view, the "Physical layer" of the present system includes this baseband processing engine element. In some implementations, the interface between the first and second element is at baseband frequency (i.e. between the radio transceiver and the baseband processing engine). In other implementations, the interface is at some intermediate frequency, somewhere between the baseband (0 Hz) and RF frequency (e.g. 60 GHz). In addition, a control interface allows the baseband processing engine to control the properties of the radio transceiver, including parameters such as beam direction, antenna phase, transmit power, gain of amplifiers, polarization mode, etc. These first and second elements combined enable the transmission of digital signals over a wireless link in a certain direction.

Using the control interface, the baseband processing engine configures the antenna beam. In some implementations, the baseband processing engine configures the antenna beam by applying a set of phase shifts to each element in the array. Alternatively or additionally, the baseband processing engine configures the antenna beam by applying a complex number that contains both phase and amplitude (gain) adjustment for each element in the array. In another form, the baseband processing engine configures the antenna beam by turning array elements on and off, this could be, for example, windows in a waveguide structure, or could be controlling polarization used for a particular baseband signal. In its simplest form, the baseband processing engine identifies a beam identifier (ID) or antenna weight vector (AWV) ID or antenna element map (AEM) ID to be used at any point in time by the RFIC. The RFIC includes a mapping of ID to actual vector or element configuration to apply, where the vector or element configuration is determined and optimized during a beam training, refinement, and/or tracking phase. In some implementations, the baseband engine provides a full AWV or AM to the RFIC, and the baseband engine maintains a list of AWVs/AEMs to use for each node that it is communicating with.

In this case, the AWV contains a set of phase and gain values where the size of the vector is equal to the number of elements in the antenna array, such that the baseband processing engine is able to control both the phase shift and any amplitude gain (or attenuation) of the signal supplied to each element (and possibly a set for each polarization of element) in the array. Or if an AEM is used, then it contains a set of settings for each element in the array (e.g. on/off), such that the baseband processing engine is able to control the effective spacing between elements in an array and/or the polarization used. Either of these approaches, and even a combination of them, allows the baseband processing engine to form various types of beam pattern and to steer both wanted energy in the desired direction, as well as to minimize the transmission of energy in the form of side-lobes, in an unwanted direction. Similarly, it allows the baseband processing engine to control where energy is received from on the receive side. It also enables a baseband engine to employ "multiple-input-multiple-output" techniques to transmit and receive simultaneously over more than one polarization to increase data rate and/or robustness. In the case where the RFIC supports simultaneous transmit and receive operations, then the baseband engine configures two sets of AWVs/AEMs to control the direction of both the transmit and receive array. In the case where the RFIC supports simultaneous transmit or receive on two different polarizations (e.g. vertical and horizontal MIMO), then there will be two AWVs/AEMs per RFIC The MAC processing engine controls the transmission of high layer protocol (e.g. Ethernet, IP, etc.) packets over one or more wireless links between nodes implementing the disclosed architecture. The MAC engine implements software that contains algorithms and methods to facilitate communication with multiple nodes using directional antennas. It also facilitates communication with nodes not within range of the wireless link, such as by using multi-hop point-to-multipont or multi-hop techniques to communicate via other nodes. The MAC processing engine is "beam aware" and intimately involved in the control of the configuration of the radio transceiver, through the baseband processing engine, to ensure frames and packets are transmitted and received with the appropriate antenna configuration. This is achieved by supplying an associated "beam configuration" to use when transmitting the frame with each MAC protocol data unit (MPDU) that is formed and sent to the baseband processing engine that hosts the physical layer functionality. As discussed earlier, the beam configuration can be a simple index to a beam ID to use, or can be a full AWV. In some implementations, the MAC engine enables the use of a baseband processing engine that is not "beam-aware." For example, the MAC engine may interface directly to the RFIC such that it controls the RFIC and the baseband processing engine concurrently to ensure that the signal generated (or received) by the baseband engine is transmitted (or received) with the appropriate beam configuration. In such implementations, the MAC engine would facilitate beam-forming training by configuring the baseband engine in a mode that supports this (e.g. low data rate, high processing gain) and then transitioning it to a "data-mode" (e.g. higher data rate, reduced processing gain) once training is complete. The MAC engine may generate control-frames and insert these into the data-path, e.g. in the form of specially addressed Ethernet frames, that the baseband is processing as well as control the PPF function to ensure that frames are only transferred to and from the baseband when it is operating in "data-mode".

The MAC processing engine is also capable of supporting multi-hop point-to-multipoint or multi-hop mesh communications, or the transmission of a frame seamlessly over multiple, successive wireless links without the intervention of higher-layer protocols. It may achieve this by incorporating a layer-2 forwarding function within the MAC layer so that frame forwarding decisions can be made within the MAC layer itself, as the MAC layer is aware of the status of inbound and outbound physical links and beam settings. Incorporating a layer-2 forwarding function with the MAC layer enables rapid decision-making and optimal decisions to be made by the forwarding function that is both physical layer status and beam aware. One benefit of MAC layer relaying is that per link latency can be reduced compared to using higher-layer bridging. In addition, the utilization of the inbound and outbound physical layer link can be adjusted in harmony, resulting in more efficient transport of packets compared to where relaying was performed without context of the MAC and physical layer status. Referring to FIG. 3F, this allows a single module to provide both the "downstream" (e.g. to an access point) and "upstream" (e.g. to a hub station) relaying of frames simultaneously. In implementations in which relaying is provided at a higher layer, two modules may be required—one connected to the hub and one connected to the access point.

Figure 3D:
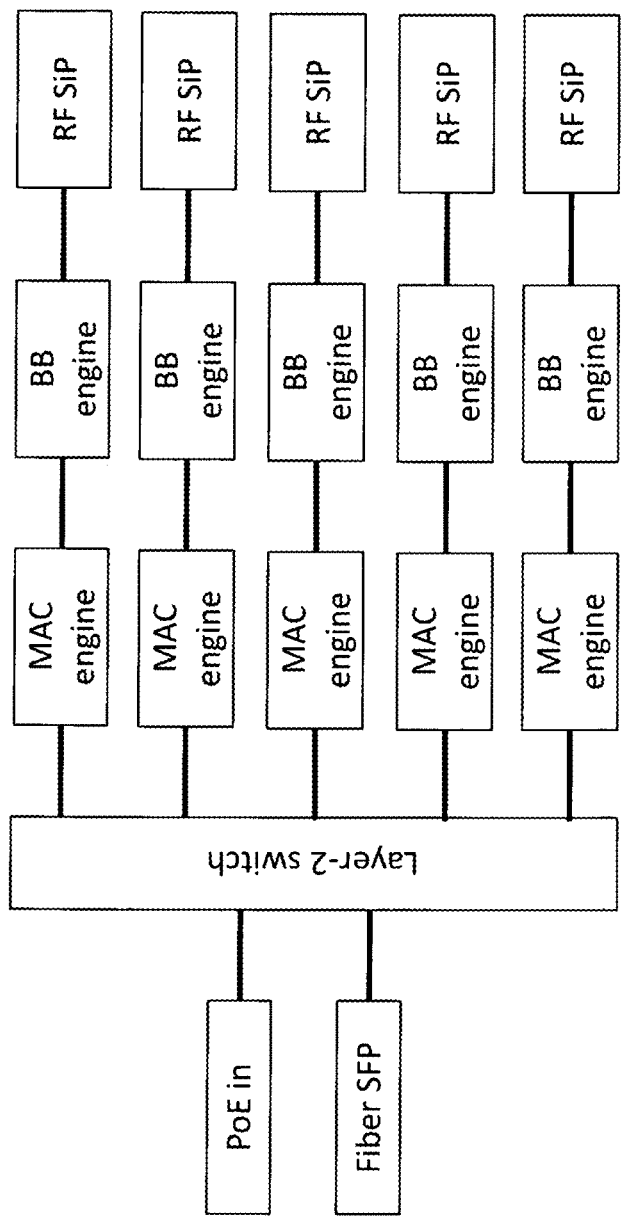
FIGS. 3D-3F and 3H-3K are diagrams showing elements incorporated into different implementations of the modules of FIGS. 3A-3C.
Figure 3E:
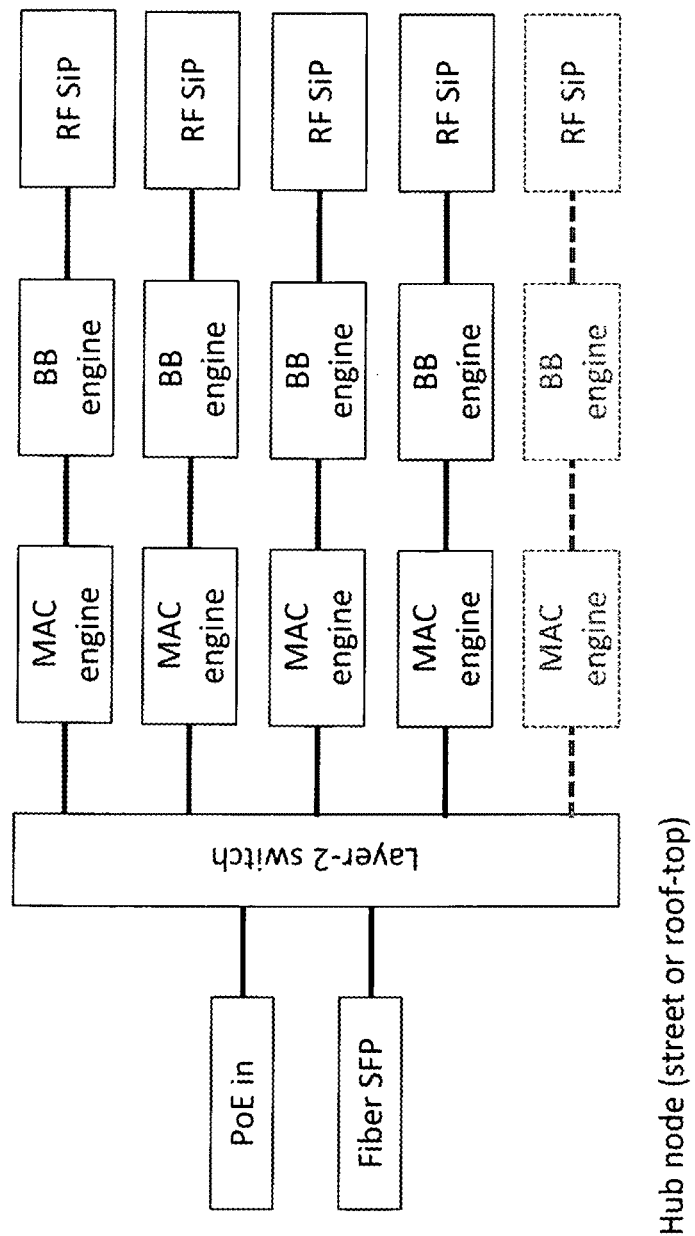
Figure 3F:
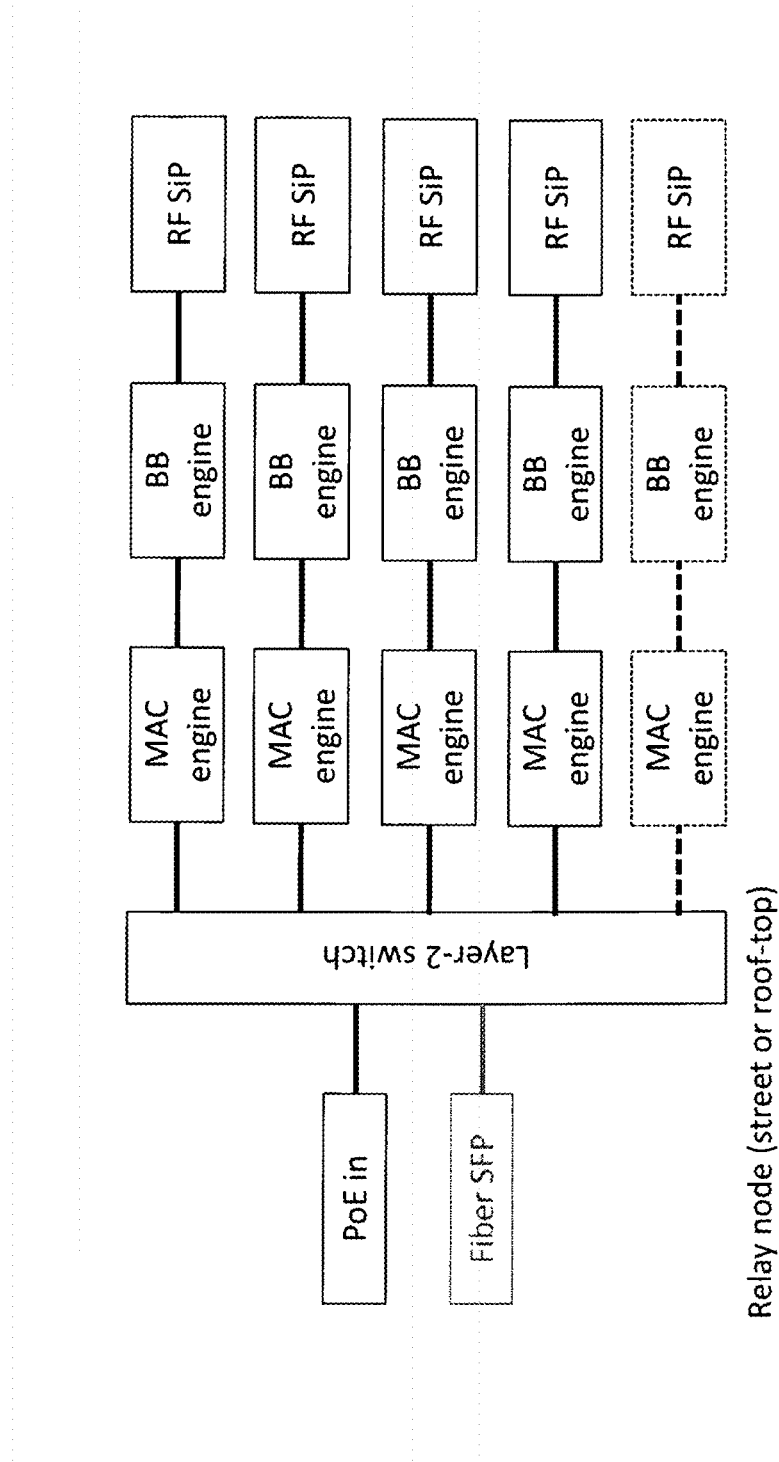
Figure 3G:
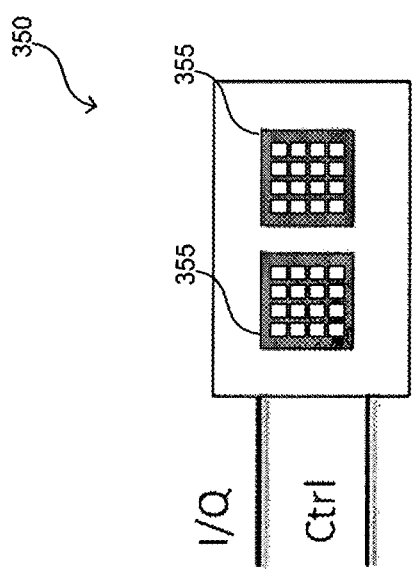
FIG. 3G is a diagram showing an example of an RF SiP architecture.
Figure 3H:
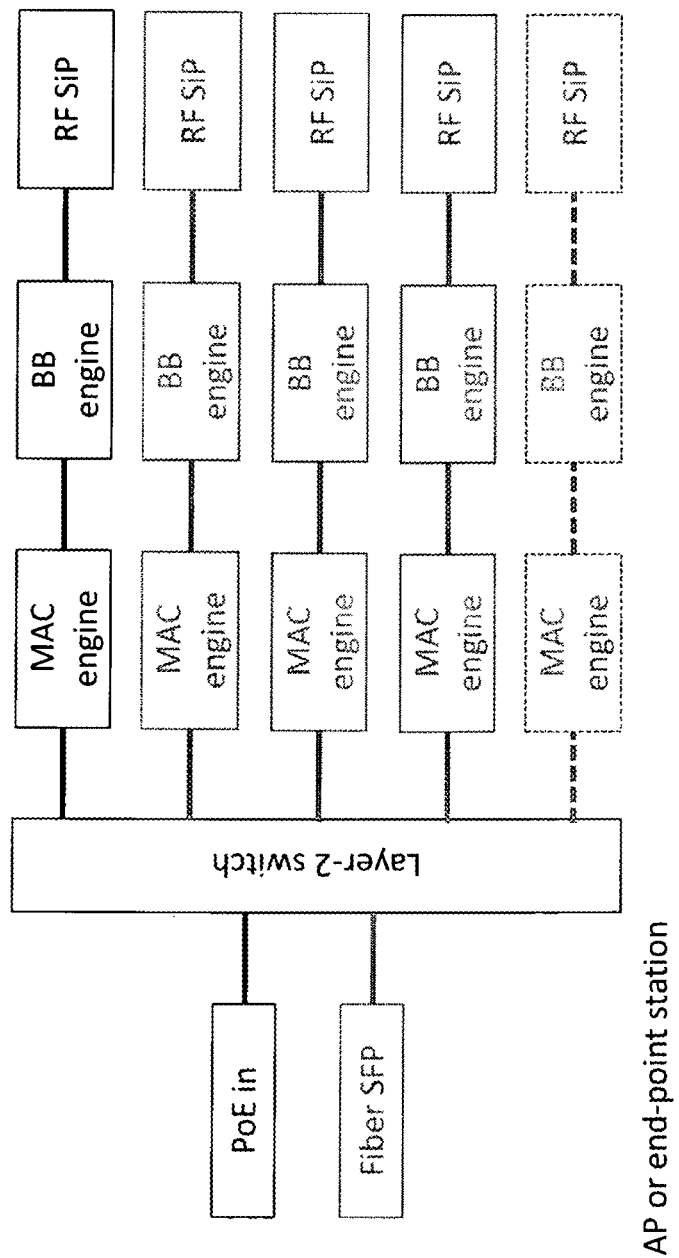
Figure 3I:
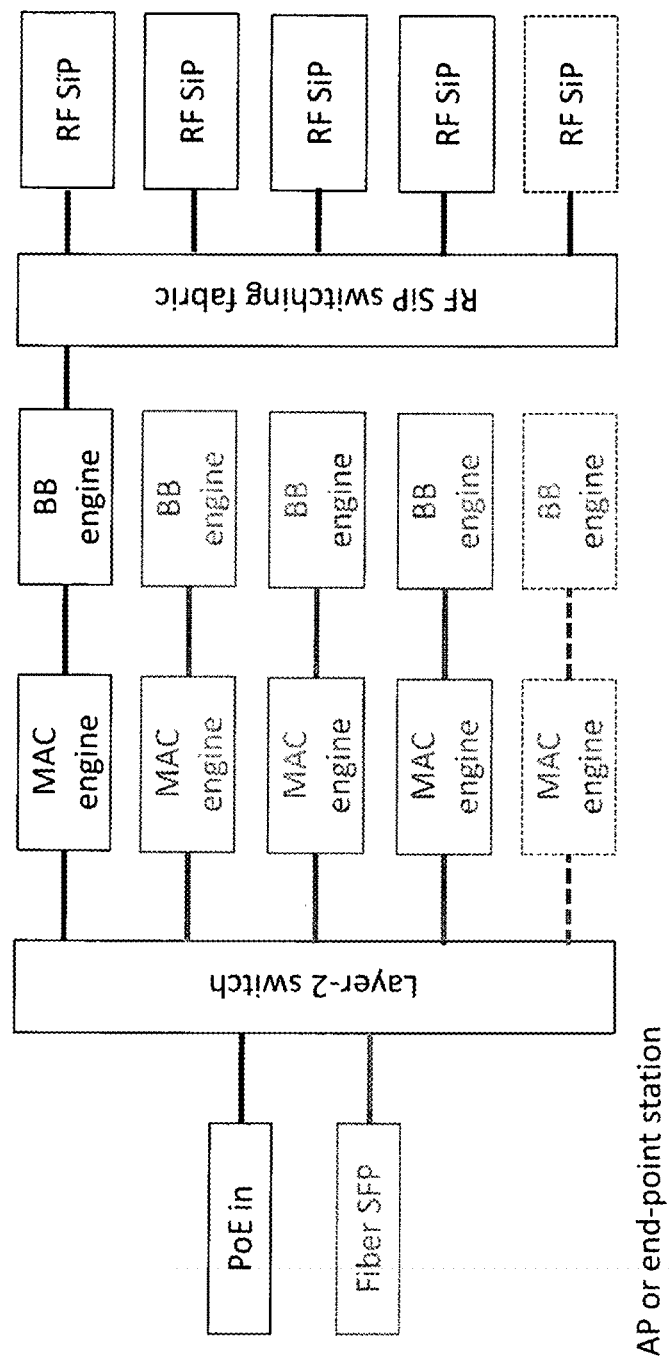
Figure 3J:
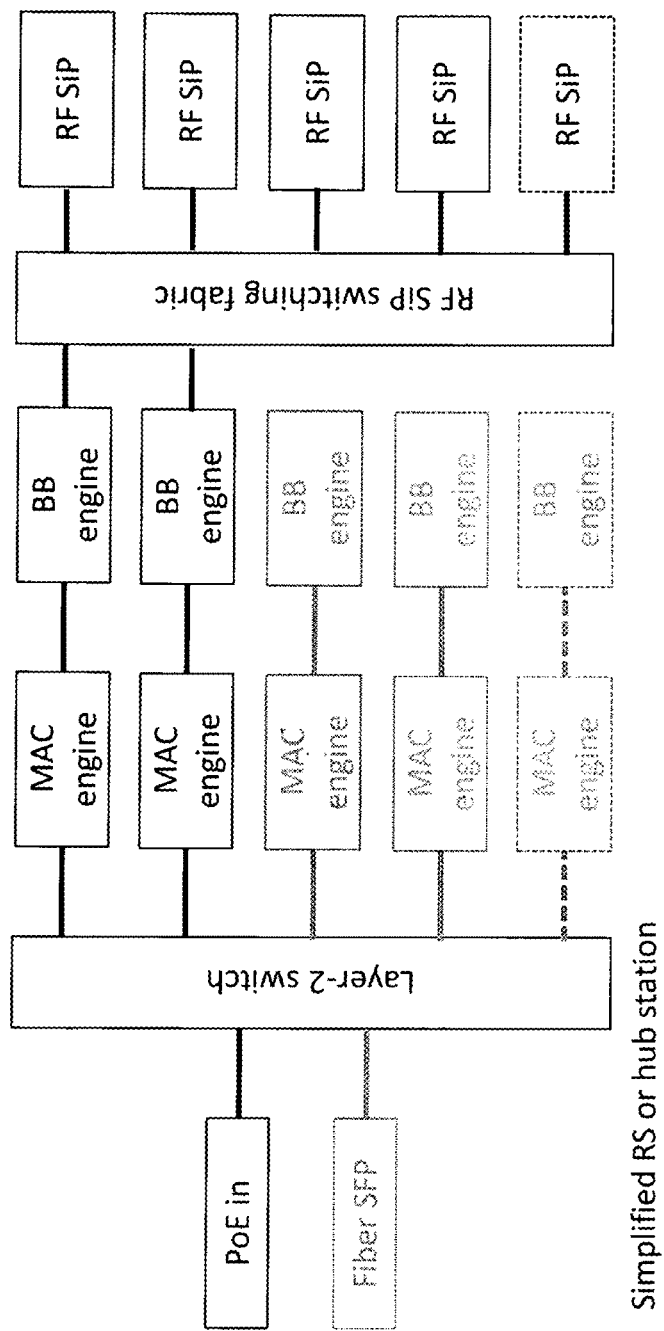
Figure 3K:
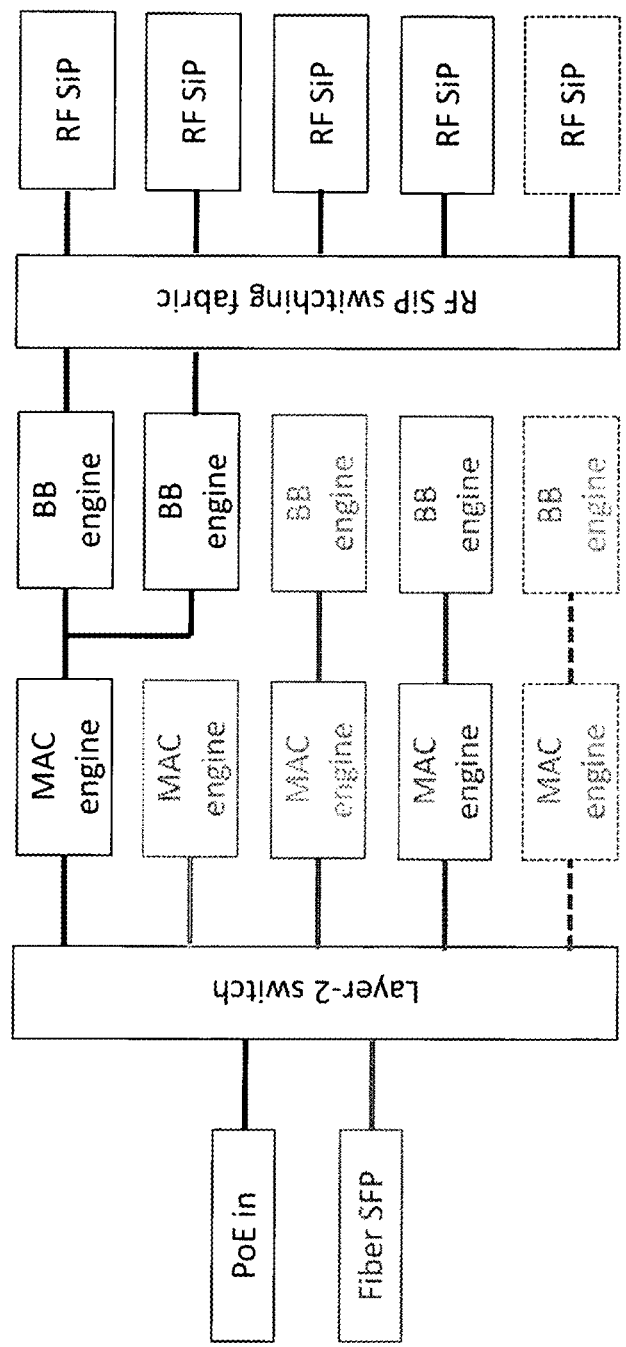

Referring to FIG. 3K, the MAC engine may also interface with multiple baseband engines, such that it is controlling more than one instance of the physical layer. In this case, the MAC engine is able to efficiently control the forwarding of frames over links controlled by the two baseband engines.

In general the operation and interaction between the wireless "beam-aware" MAC, baseband physical layer and RFIC enables the "beams" to become analogous to "ports" in a wired layer-2 Ethernet switch, with the wireless MAC layer managing the efficient forwarding of frames from one "port" (which is actually a "beam") to another.

In addition, the functions of the MAC layer support auto discovery of other nodes and maintenance of wireless links found to other nodes without user intervention. The MAC layer also supports the configuration of appropriate frame and packet forwarding or configuration of tunnels to aid forwarding of frame and packets over multiple wireless links between the source and destination node in the wireless network. Auto discovery is supported by nodes that are established and operating in the network transmitting "beacons" or signals that identify their presence, such that nodes wishing to associate with the next node can learn of nodes to which they can gain access to the network. As the beamforming is used by the transmitter, this involves having nodes attached to the network "beam sweeping" the transmission of the beacon. This is achieved by transmitting the beacon multiple times, over a period of time, each time sending it to the baseband processing engine for transmission using a different beam ID (or AWV). The receiver typically listens for such transmissions using either a quasi-omnidirectional receive mode, or some form of coarse antenna beam to enable it to hear the beacon. As full optimal receive side beamforming is typically not available, the beacon is sent using very robust transmission approaches so that it can be received by a node that is not implementing high gain receive side beamforming. Once the beacon is received and the transmitter and receiver are essentially synchronized, then receiver side beamforming can take place to enable the transmitter and receiver to communicate using more spectrally efficient encoding schemes thereby achieving the target throughput rates.

The layer-2 PPF enables higher layer packets sourced from, or destined to, a wireline network to be transported over the wireless link. At a minimum the PPF is responsible for translating Ethernet frames into wireless MAC frames. In the case there are no frames to be sourced from or supplied to the wireless network, the PPF may at a minimum act as a power source using power-over-Ethernet technologies. In the case of a node with multiple modules, then the PPF on one of the modules may provide a "master" function, which may include acting as a layer-2 bridge or switch. Referring to FIG. 3E, the PPF can be associated with one of the four modules shown. The other modules then connect to the first module, which provides the PPF between the fiber small form-factor pluggable (SFP) port, the master wireless module and the other 3 modules connected to it.

The system effectively converts Ethernet frames (and packets encapsulated within them, such as IP and/or MPLS) to mmWave transmission, and performs the reverse process for receiving frames and packets to/from multiple sources. The module is powered either separately or by using a shared Ethernet and power interface, commonly referred to as PoE (power-over-Ethernet).

Referring to FIG. 3D, general elements that comprise a module are shown, and in particular, FIG. 3D shows multiple modules that may be combined to provide the overall functionality required at a hub, relay station, access point or end-point station. FIG. 3E and other, similar Figures show alternative implementations with some unused elements from FIG. 3D shown grayed out. FIG. 3E shows a hub node that provides a backhaul to a wider area network through a fiber SFP port (or other appropriate interface, e.g. copper Ethernet). The node typically contains 2, 3 or 4 60 GHz modules to provide coverage in 2, 3 or 4 directions to achieve up to 360 deg coverage. Assuming 1 Gbps capacity per module, using a module per direction enables hub to provide 4 Gbps of backhaul capacity. The per module capacity can be upgraded over time, for example 2.5 Gbps/module utilizes a 10G fiber connection. Layer-2 PPF, including layer-2 switch or bridge functionality, may be provided by one module operating in "master" mode, with enough interfaces to support PoE in, fiber SFP (or other external network connection) and up to 3 other 60 GHz modules connecting to it. Alternatively or additionally, PPF functionality, including layer-2 switch or bridge functionality, may be provided by a separate module integrated into the AP or pluggable unit, along with the 60 GHz modules.

FIG. 3F shows a relay node which connects to a hub to provide connectivity to the WAN, where power is supplied over a PoE port. The relay node may include 1 or more modules, depending on total "field-of-view required". One implementation can contain five modules: four to provide north, east, west, south coverage, and one to provide upward looking coverage to rooftop mounted nodes. The relay module can operate in half or full duplex mode, depending on configuration:

Full duplex relay with full duplex links: Module 1 can be communicating with an AP, while Module 2 is relaying frames to/from the hub;

Full duplex relay with half duplex links: Module 1 can be receiving from an AP while transmitting to the hub (or transmitting to the AP while receiving from the hub);

Half-duplex relay with full duplex links: Module 1 can be communicating with the AP at one point in time, then relaying frames to the hub at another point in time; and Half duplex relay with half duplex links: Module 1 is either transmitting or receiving to/from the AP or node, alternating in time between direction and transceiver function.

FIG. 3H shows an AP or endpoint station, which connects to a hub/relay to provide connectivity to the WAN. The AP or endpoint station may include 1 or more modules, depending on total "field-of-view required". One implementation can have one module that with the AP backhaul "window" or pluggable module roughly pointed in the direction of an RS or hub. PoE then provides the power as well as the port of connection to the host access point.

FIG. 3I shows another example of an AP or endpoint station, which includes multiple RF SiPs, but one MAC and baseband (BB) engine. The layer-2 PPF then allows the MAC and BB engine to be connected to any one RF SiP to enable communication in a given direction (e.g. either North, East, South, West, or even upwards). This example enables full field of view associated with a hub, but without the cost/complexity/power consumption associated with having to fully populate 4 or 5 full modules worth of components. The BB engine then controls the RF SiP switching fabric to ensure the appropriate RF SiP is configured for transmission or reception of any particular frame.

FIG. 3J shows a simplified RS or hub station. The RS or hub station can populate a full range of RF SiPs to provide wide area coverage without populating the same number of MAC & baseband (BB) engines to implement a reduced complexity RS or hub. For example, if a RS only ever needs to send data to one "superordinate" station and communicate with one "sub-ordinate" station at any one point in time, but needs full field of view coverage, then 2 MAC & BB engines can connect to the RF SiP switching fabric to enable flexibility in how the MAC engines connect to an RF SiP to send/receive frames in a given direction.

FIG. 3G shows an example of an RF SiP architecture 350, which contains either one or two antenna arrays 355 comprised of multiple antenna elements. Each RF SiP may comprise one or more RFICs, and each RFIC may be capable of transmit, receive or both transmit and receive operation. Each array may comprise one or more sub-arrays of antenna elements with each sub-array driven by one transmit or receive chain of an RFIC. In the case multiple RFICs are used, and more than one RFIC is operating in transmit or receive mode at the same time on the same channel, then in order to for the two RFICs to effectively increase the gain of the array, then additional combining of signals is required either prior to or in the baseband engine, depending on whether the baseband engine is capable of interfacing to multiple RFICs. Alternatively the two or more RFICs that are operating in the same mode may be configured through software to work independently to form beams in different directions to enable simultaneous communication with more than one other node. As such, the "RF SiP" and "array" is combination of multiple RFICs and/or sub-arrays of antenna elements that are packaged in a variety of ways to provide the integrated RF SiP. One such packaging approach is to include the RFIC silicon die(s) inside conventional integrated circuit package(s) (e.g. a ball grid array (BGA)) that are then mounted on to an appropriate substrate that contains the array elements. Alternatively the dies are directly bonded to the substrate. Overall the approach of using multiple RFICs in an RF SiP and sub-arrays in an array enables a practical trade-off between the number of transmit and/or receive chains (and hence components) per RFIC, the number of RFICs, and the number of elements per sub-array, which in effect enables a trade-off between overall cost, size, power consumption, beam width, steering range of the beam and performance.

As well as supporting half-duplex operation with time division duplexing, two arrays can support full duplex link operation, or full duplex relay/half-duplex link operation using frequency division duplexing. Full duplex link operation is achieved by a transmit (Tx) and receive (Rx) array pointing to the same node and allowing packets to be transmitted and sent at the same time. Frequency division full-duplex (FDD) operation is supported without the need for analog domain channel or sub-band filter, commonly referred to as a duplexer or diplexer, and typically required in any FDD communication system that has to share certain elements of the transmitter or receiver (e.g. antenna). Due to the high-level of integration proposed and the operating frequency, it is possible to ensure sufficient isolation between the transmitter and receiver components and antenna arrays to prevent the transmitted signal interfering with the received signal in the analog domain. In light of this, transmitted signals may be filtered from received signals entirely in the digital domain.

Isolation between transmitter and receiver components is achieved in various ways. Isolation may be achieved by using separate transmit and receive antennas that are physically separated. At mmWave frequencies the separation does not need to be large due to the short wavelength. Isolation may also be achieved using beamforming to ensure that both the transmit and receive arrays are focused away from each other. Isolation may further be achieved by using robust modulation and coding schemes, which can be used due to the abundance of bandwidth, meaning that any residual leakage of energy after processing in the digital domain has minimal impact on receiver performance. For example, separation of a few centimeters provides at least 30 dB of isolation; in addition, with beamforming applied, the transmit and receive sidelobes can be ~30 dB attenuated. The net result is a combined analog domain isolation of >90 dB which is of the order of that provided by a traditional duplexer. Further isolation could be provided by building low-profile "wall" (e.g. a sufficiently designed metallic, or other material, insulator) between the two arrays to reduce the effective coupling of signal between the two arrays. It is possible that as well as enabling improved operation (e.g. at higher order modulation and coding schemes, or reduced digital domain processing requirements) on adjacent frequencies, that with sufficient additional attenuation by a wall that isolations of >100 dB could be achieved enabling full duplex operation where the same channel is used for both transmit and receive.

Full duplex relay operation is achieved by the Tx array pointing to one node while the Rx array points to the other node; the Tx/Rx arrays then alternate over time to allow relaying of frames in both directions. This mode of operation can be particularly beneficial in networks with highly asymmetric traffic: e.g. downlink centric where data is generally flowing from hub to relay to AP to end-point. It also allows a module pointing in a coarse direction that needs to perform relay function to operate efficiently (e.g. hub and an AP are both North of the RS). Alternatively if only one array is available, or only one array can be active at any one point in time, then half-duplex operation can be supported.

In the general sense, due to the lack of an analog duplexer or diplexer, the frequency channel used for transmit and that used for receive can be defined in software, as well as whether the system is operating in full or half duplex, with frequency or time division duplexing, such that software-defined duplexing (SDD) is enabled.

FIG. 3K shows an example of a different type of module that has more than one baseband processing engine associated with a MAC engine. While FIG. 3K only shows two baseband processing engines associated with a single MAC engine, a further extension of this approach is to generally incorporate all MAC functionality for multiple baseband processing engines into one MAC engine. This enables the efficient forwarding of frames between wireless channels being managed by different baseband processing engines, as the MAC engine can directly forward frames from one baseband engine to the other without having to forward them through the layer-2 switch.

Figure 5:
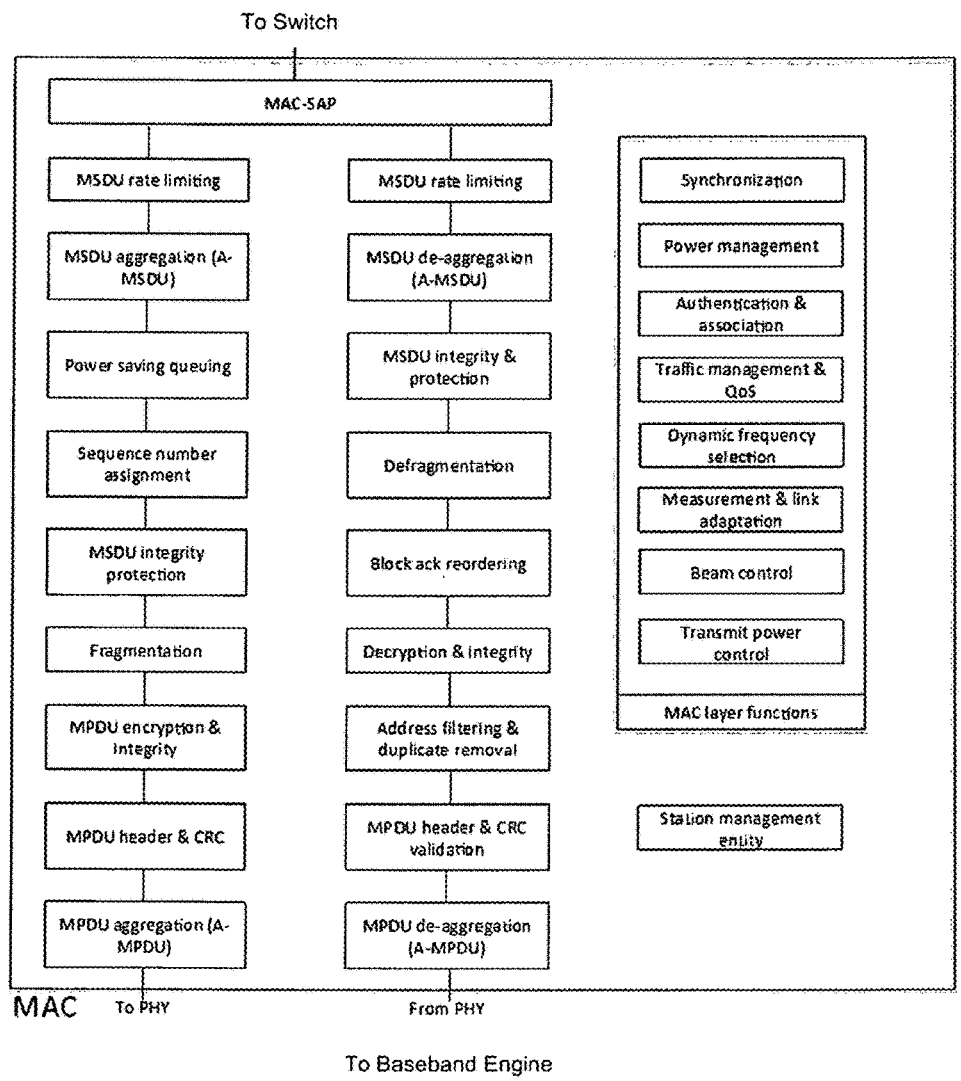
FIG. 5 is a diagram showing medium access control (MAC) layer data plane architecture and its key functions.

FIG. 5 shows the functional blocks of the MAC processing engine of FIG. 1, which is connected between the PPF and the baseband engine. The functional blocks of FIG. 5 are generally self-explanatory based on the detailed description provided herein. The MAC processing engine of FIG. 5 employs a MAC layer data plane architecture associated with a node implementing the IEEE 802.11 protocol, or similar. The data plane translates frames from the logical link control (LLC) layer entity to MPDUs for transfer to the physical layer (PHY) through the PHY-SAP, and performs similar reverse operations on the receive path. FIG. 5 also shows control and management plane functional blocks that may be included in a node. These functional blocks are responsible for controlling the data path operational behavior and the physical layer behavior, and they are also responsible for transmitting and receiving control and management frames to and from other stations to support functions such as enabling and maintaining access to the network.

Overall, the functional blocks shown in FIG. 5 are generally common among, e.g. APs, and the data-path is fixed, as per the standard (e.g. IEEE 802.11), as this is what enables a node from one vendor to send data packets to another. Specifics of some the algorithms behind the control plane functions, can be implementation specific, such as beam control, link adaptation, and dynamic frequency selection. In addition, the MAC processing engine may employ MAC-layer forwarding of MPDUs as noted here for multi-hop point-to-multipoint relay functionality.

The functional blocks in FIG. 5 include MAC-SAP, MAC Service Data Unit (MSDU) rate limiting, MSDU aggregation (A-MSDU), power saving queuing, sequence number assignment, MSDU integrity protection, fragmentation, MAC Protocol Data Unit (MPDU) encryption & integrity, MPDU header & CRC, MPDU aggregation (A-MPDU), MSDU rate limiting, MSDU de-aggregation (A-MSDU), MSDU integrity & protection, defragmentation, block ack reordering, decryption & integrity, address filtering & duplicate removal, MPDU header & CRC validation, and MPDU de-aggregation (A-MPDU). Functional blocks also include MAC layer functions of synchronization, power management, authentication & association, traffic management and QoS, dynamic frequency selection, measurement & link adaptation, beam control, and transmit power control. Functional blocks further include station management entity.

Figure 6:
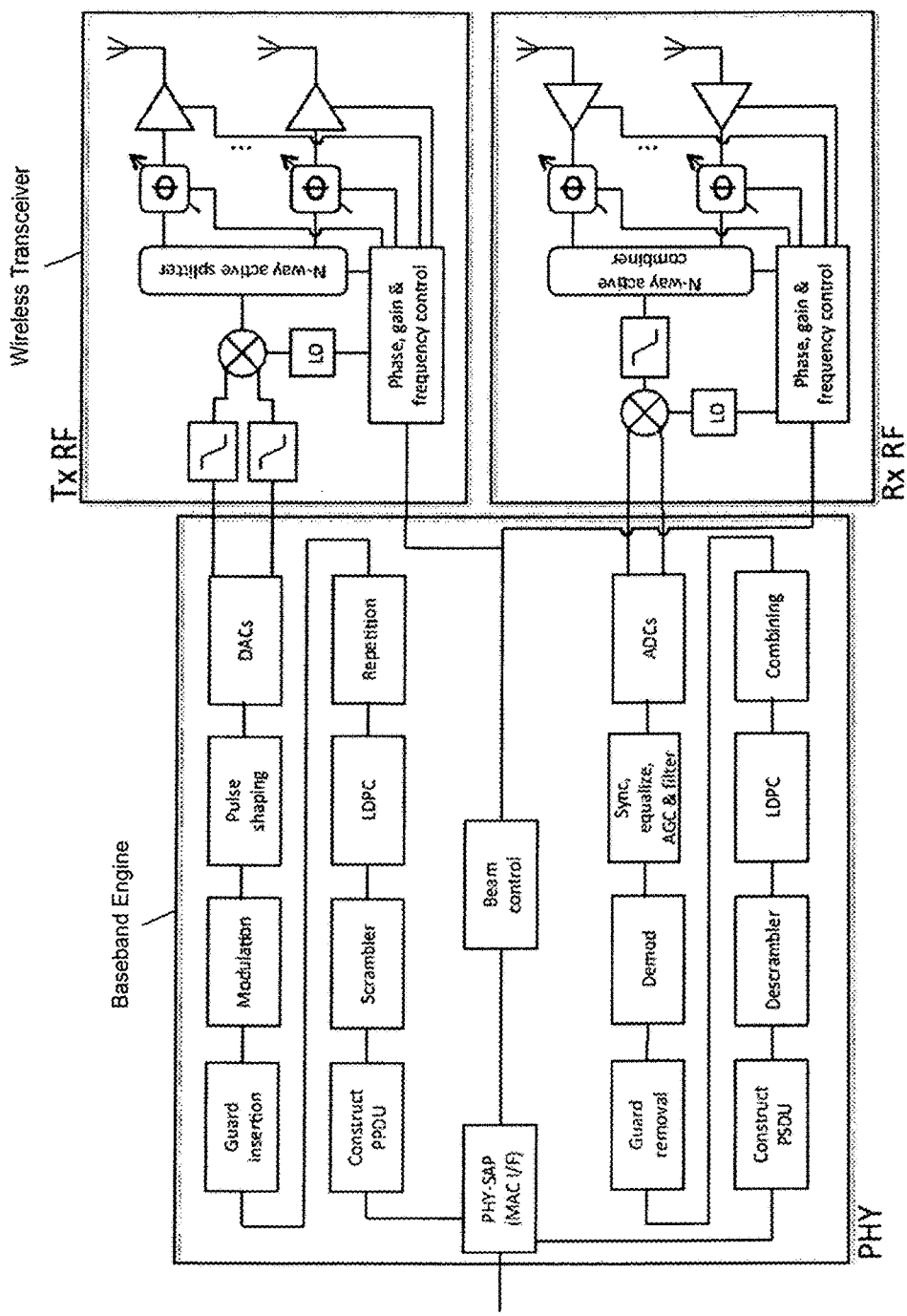
FIG. 6 is a diagram showing physical (PHY) and radio frequency (RF) architecture.

FIG. 6 shows the functional blocks of the baseband engine and radio transceiver of FIG. 1. The functional blocks of FIG. 6 are generally self-explanatory based on the detailed description provided herein. FIG. 6 shows PHY data plane (i.e. the BB processing engine) and RF layer architecture (i.e. radio transceiver) associated with a node that is implementing the single carrier physical layer IEEE 802.11 protocol. The RF architecture uses direct conversion from baseband to RF and employs phase shifting at RF. In some implementations, other approaches are used, such as a two stage superheterodyne architecture under which a signal is converted from baseband to an intermediate frequency (e.g. 15 GHz) and then to the RF frequency. The phase shifting and gain control as part of forming a beam may be performed at baseband or in the local oscillator path. This phase shift and gain control at baseband or in the local oscillator path may be either the entire shift and gain required to form a beam, or could be in part applied at the baseband or local oscillator path in addition to phase shifting and gain control at intermediate or RF stages.

Overall, the functional blocks shown in FIG. 6 are generally common among, e.g. APs, though the operation of the encoding/decoding (LDPC) block may differ by implementations. However, the module, such as the PPF, and MAC and BB engines, may generally employ off-the-shelf silicon, upon which is layered software/firmware to support for efficient multi-hop point-to-multi-point relay.

The functional blocks in FIG. 6 include: guard insertion; modulation; pulse shaping; DACs; construct presentation protocol data unit (PPDU); scrambler; low-density parity-check (LDPC); repetition; PHY-SAP (MAC I/F); beam control; guard removal; demod; sync, equalize, AGC & filter; ADCs; PSDU, descrambler; LDPC; combining; phase, gain & frequency control; N-way active splitter; phase, gain & frequency control; and N-way active combiner.

The system supports centralized operations and maintenance (OAM) and facilitates the node and architecture to be self-organizing, in the sense that the network of nodes will be a dynamic self-organizing network (SON) supporting multi-hop point-to-multipoint or multi-hop mesh topologies. To facilitate this software defined networking (SDN) approaches may be utilized, including the use of OpenFlow, such that some of the control plane functionality required to support the operation of the node in a network of nodes is provided by a centralized controller. In this architecture each node presents an application programming interface (API) to allow the centralized function to control the behavior of the node within the network of nodes.

The system described above includes several elements, combined together, to create a new type of wireless communications system (hardware and embedded software) that is able to provide low latency, Gbps communications over much longer ranges than may otherwise be possible. In addition, the approach of using centralized OAM, dynamic SON and SDN (and SDD in the case frequency division duplexing is required) enables a large network of numerous nodes to be deployed and operated with ease, and for the network to be able to self-optimize based on traffic patterns and changes in topology caused when certain wireless links become available or unavailable between any two nodes within the network.

The system can be realized using a number of system-on-chip (SoC) and system in package (SiP) devices (integrated circuits and systems) mounted on to a printed circuit board (PCB). Alternatively the various elements can be implemented on separate silicon dies and integrated into one or more SoCs or SiPs, and ultimately all the elements can be implemented on a single silicon die and packaged in a SiP.

The hardware module described above forms a basic building block that has multiple features, including: capable of being combined with access nodes either as an integral module, or as a field pluggable device, to provide metro-wide transport connectivity; capable of being packaged with one or more other modules to provide a "relay" function to allow two or more access nodes to connect; capable of being packaged with other modules to provide a "hub" function to allow nodes to connect to a fiber link to the core network; etc.

A node with multiple modules may incorporate all of the elements described on each module, or one of the modules can behave as a master module, itself driving, for example, just the PHY and/or RF element on one or more other modules.

One benefit of such a solution is that it enables a number of very low cost, high capacity simple wireless links to be provided, leveraging highly integrated and relatively low-cost electronics, but, by relying on intelligence in the software residing on the modules, enables dynamic, adaptive, low latency and resilient multi-hop point-to-multipoint or multi-hop mesh networks to be formed. As such it enables the potential to offer a much lower cost per GB solution, but also enables the easy deployment of a very resilient network.

One of ordinary skill in the relevant art will recognize that, although not required, aspects of the invention may be implemented as computer-executable instructions, such as routines executed by a general-purpose data processing device, e.g., a server computer, wireless device, personal computer, etc. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The system may work with various telecommunications elements, include 2G/3G/4G network elements (including base stations, Node Bs, eNode Bs, etc.), picocells, etc. Alternatively or additionally, the network includes an IP-based network that includes, e.g., a VoIP broadcast architecture, UMA or GAN (Generic Access Network) broadcast architecture, or a femtocell broadcast architecture. (Unlicensed Mobile Access or UMA, is the commercial name of the 3GPP Generic Access Network or GAN standard). Of course, VoIP using WiFi access points (APs) or other nodes of an IEEE 802.11 network may be used.

2. Topology Management Procedures

This section discusses high-level methods and procedures for managing topology formation, adaption and frame forwarding. In some implementations, the methods and procedures are used in a wireless network in which at least some nodes are point-to-multipoint capable, as well as capable of forwarding or relaying (wireless bridging) frames. It is anticipated that these procedures will form the basis for a topology management protocol that could form an extension to an existing set of MAC protocols, such as those defined in IEEE 802.11ad, or as part of a proprietary MAC protocol.

In some implementations, the methods and procedures are used in a system communicating in the 60 GHz band and relying on dynamic beamforming in order to support point-to-multipoint communications over reasonable link distances. The system is also being used to effectively extend the service of a wider area network out to end-nodes.

One of the key differences between topology management for dynamic wireless networks and wired Ethernet with RSTP is the notion of association available in wireless networks versus the control over the formation of physical layer links that is available in wired Ethernet networks. For a variety of reasons, nodes in a wireless network form associations with each other before an active communications path is formed. The result is that a wireless multi-hop point-to-multipoint network will naturally form as a loop-less tree topology, as it has control over what physical layer connections to establish.

However, a protocol is needed to ensure the efficient formation of an initial tree when the network starts up and to provide support for dynamic adaptation of the topology, in a self-organizing manner, when a node joins or leaves the network, or when a link is lost or becomes available.

In general, after it is initially formed, three events can a change in topology:
  A node joins the network
  A node exits the network
  A node changes its point of primary association to the network Any of these events will cause a topology change that could effectively ripple through the network and cause other nodes to change their points of primary association. Therefore, any of these events may trigger wide-scale topology adaption throughout nodes of a network.

Prior to considering these events that cause changes in topology, the first subsection below describes how the initial network topology is formed. The second subsection then addresses events that may cause an adaption in topology.

2.1 Initial Topology Formation

In some implementations, in a wireless network, like those described herein a node does not advertise itself as being available for other nodes to connect to (i.e. it does not broadcast a beacon indicating its existence) until it has itself connected to a network and can provide connectivity to a WAN, unless it can itself provide some higher layer service to other connecting nodes.

The first station to start broadcasting its availability is therefore a node with connectivity to the WAN, or ability to provide some higher layer service to other nodes, this type of node is called a hub node and it is configured as such by the fact that it knows a connection exists to the WAN (e.g., fiber, wired Ethernet or other wireless connection), or it can provide higher layer services (e.g., access to stored data or other device that stores or generates data that is to be made available). This node is similar to the root bridge in the case of RSTP.

All non-hub nodes are initially scanning to find a node to which they can attach. Nodes that receive beacon information from a hub node consider associating with the hub node. Once a non-hub node has associated with a hub node, the non-hub can also advertise its existence to enable other non-hub nodes, such as those out of communication range with the hub node, to discover and connect to them.

Nodes broadcasting their existence also broadcast other information, including a "hub path cost." A node detecting multiple nodes broadcasting their existences can evaluate hub path costs received from each node to determine the best node to associate with. In some implementations, a primary association is formed with the node broadcasting the best hub path cost.

Hub path cost is a metric quantifying a cost for accessing a hub through a node. In some implementations, hub path cost is a function of the characteristics of the path between the node advertising the hub path cost and the hub node. In some implementations, characteristics include a total number of links, or hops, that constitute a hub path. For example, if a hub path consists of 4 links, the hub path cost would be 4. In some implementations, characteristics include an aggregate latency over the links that constitute the hub path. For example, if each link of a hub path adds 1 millisecond of latency, the hub path cost may be represented as 4 milliseconds. In some implementations, characteristics include a cost associated with accessing a WAN via a hub node. For example, a hub path cost indicative of a latency of a hub path may factor in a latency associated with a hub node. Accordingly, the hub path cost may be representative of a latency between the node and a WAN. In some implementations, a hub path cost is determined by the amount of bandwidth available over the path provided by the node advertising the hub path cost, which in itself would be the minimum of the hub path cost advertised by the next upstream node and that available to any connecting node. As can be appreciated, a hub path cost may indicate at least one of latency and available capacity, which are useful for a connecting node to evaluate when selecting the best point of attachment. In the case of a latency related metric for hub path cost, a lower value represents a better hub path cost, whereas in the case of available bandwidth, a higher value represents a better hub path cost. In some implementations, a hub path cost is calculated using an inverse function of available bandwidth, or "path utilization" where path utilization could be an absolute value (e.g. average Mbps or Gbps utilization) or relative (e.g. average 10%, 50%, 75% of available bandwidth used). Adopting this approach would mean that irrespective of if latency or utilization is used in derivation of the hub path cost, the principle that lower is better will always apply.

In some implementations, hub path cost is calculated based on a composite of latency and utilization (or available bandwidth), indicated either as two separate values or weighted to calculate a single hub path cost value. If a weighted value is used, the formation of the weighting function may be arranged such that a high value represents high latency, high utilization (or low available bandwidth), or a combination of both. Conversely, a low value would indicate low latency and low utilization (or high available bandwidth). With this approach for calculating hub path cost, a higher value indicates a worse hub path than a node that advertises a lower value.

Hub nodes can also broadcast a hub path cost. A hub path cost associated with a hub node reflects a cost for accessing a WAN or service via a direct connection to that hub node. In some implementations, a hub path cost associated with a hub node is indicative of a current latency to access a WAN or service through the hub. In some implementations, hub path cost for a hub node reflects a status of the hub node, such as its available capacity, its utilization (e.g., a percent of its bandwidth that is utilized), a typical access latency for the hub node, or the like. In calculating a hub path cost, a node that is not a hub node may factor in a hub path cost of a hub node that it is connected through to a WAN. In some implementations, the hub node is itself a server computer offering services, and hub path cost reflects a cost for accessing those services.

Hub path cost can also consider other factors or be derived using other methods. In a general sense, a hub path cost is a representation of one or more key path related metrics that provide a simple value by which a node seeking to join a network may determine which is the "better" path to use; in addition in the general sense the hub path cost could be a single value derived from a single metric, a single value derived from a number of metrics by applying some weighting function, or multiple values each representing a single metric and/or the result of a weighted function applied to two or more metrics.

A node may also form alternate associations in addition to its primary association. Under a procedure for establishing alternate associations, the node performs an association procedure but indicates that the alternate association is an alternate association for the node, instead of a primary association, that is being setup for purposes of rapid failover.

As a general summary, an approach of topology formation includes the following steps:
1) Nodes without connectivity to a WAN initialize in scanning mode, searching for other nodes advertising they have connectivity
2) Once a node has connectivity, the node broadcasts that it is connected, specifying a "hub path cost" value (or equivalent)
3) A node detecting other nodes evaluates the hub path cost values to determine associations to make (at least one "primary" association is made, with possible "alternates" also made)

Figure 7:
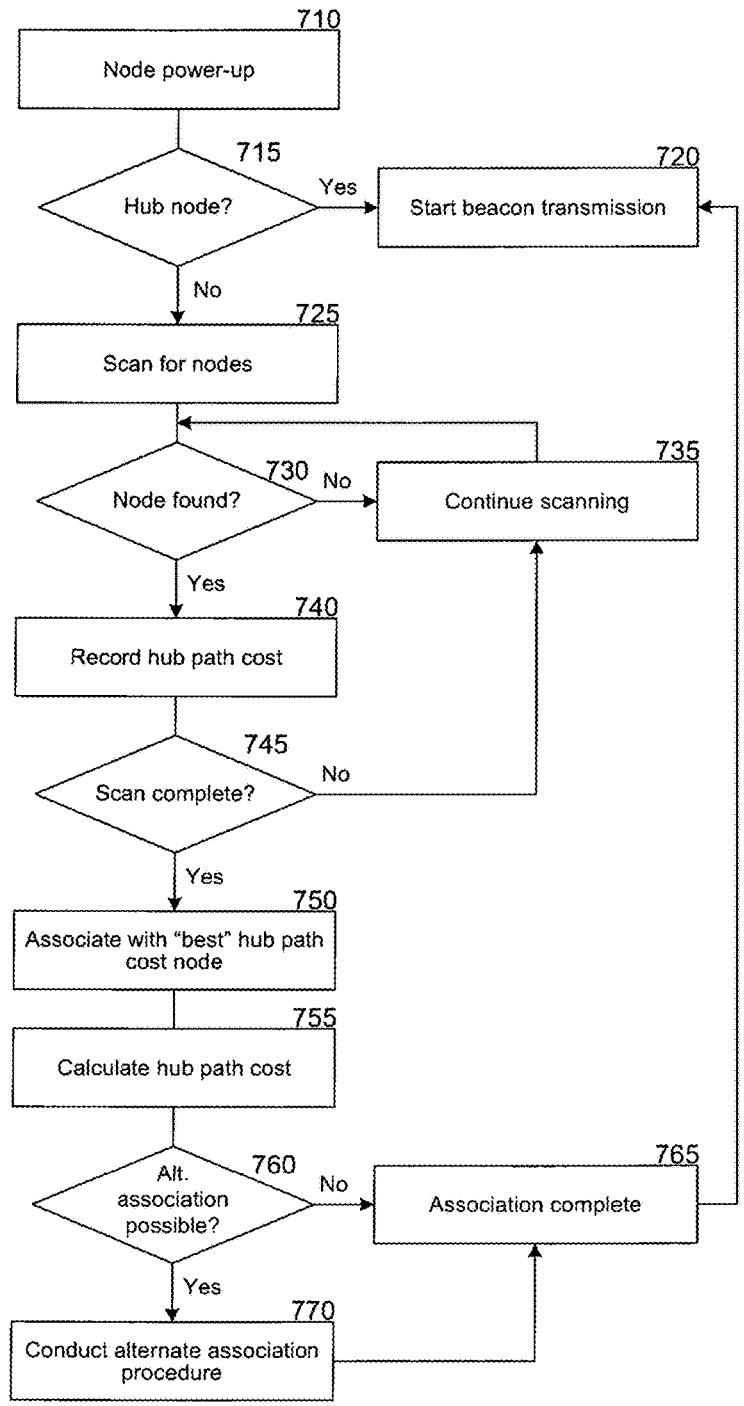
FIG. 7 is a flow diagram illustrating a procedure implemented by a network node for identifying and forming associations with other nodes.

FIG. 7 is a flow diagram of a procedure implemented in a network by a node for establishing primary and alternative associations between it and other nodes. A node that forms an alternate association maintains knowledge of the alternate node with which it is associated. For example, the node may coordinate periods of communication to maintain the alternate association. The node also monitors the condition of the link to the alternate node by periodically detecting the alternate node's beacon, enabling it to maintain synchronization information. In FIG. 7, the step of "calculate hub path cost" involves the determination, by a node, of the hub path cost value (or values) to advertise. As described earlier there are a number of potential methods that could be employed, and the method to use could be configured based on network operator preference, with a default behavior specified unless configured otherwise. During this step the selected method is applied whereby one or more metrics pertaining to the overall status of the path provided by the advertising node to the hub are used as inputs to the method to result in one or more values that constitute the hub path cost. These calculated values are then advertised by the node.

Under the procedure of FIG. 7, at a block 710 the node powers up. At a decision block 715, the node determines whether it is a hub node. If the node is a hub node, the procedure continues to a block 720, and the hub node starts a beacon transmission. If the node is not a hub node, the procedure proceeds to a block 725, and the node scans for other nodes. At a decision block 730, the node determines whether another node was found. If another node is not found, the procedure proceeds to a block 735, and the node continues scanning. If a node is found, the procedure proceeds to a block 740, and the node records the hub path cost associated with a found node. At a decision block 745, the node determines whether a scan is complete. A scan may not be complete, for example, if the hub path cost does not meet an acceptable value. If the scan is not complete, the procedure proceeds to block 735. If the scan is complete, the procedure proceeds to a block 750, and the node associates with the "best" hub path cost node. At a block 755, the node calculates hub path cost, as discussed above. At a decision block 760, the node determines whether alternate associations are possible. If no alternate associations are possible, the procedure proceeds to a block 765, and association is complete. The procedure then proceeds to block 720, and the node starts a beacon transmission. If at decision block 760, an alternate association is possible, the procedure proceeds to a block 770, and the node conducts alternate association procedures. The procedure then proceeds to block 765 and to block 720.

2.2 Topology Adaptation

Once a topology is formed, support for adaptation may be needed for at least the following cases to enable the network to continue to be self-organizing:

Node joins the network, resulting in changes to hub path costs and opportunities to optimize topology Node exits the network, resulting in changes to hub path costs and disorder in the topology that needs to be healed Node changes its point of primary association, resulting in a better primary association being available for another node or a current primary association being no longer viable The remainder of this section describes procedures for addressing at least these scenarios.

2.2.1 Node Addition

A node joining the network may follow the same association procedure described above and depicted in the example from FIG. 7. Once the new node has selected and completed its primary association, it calculates its own hub path cost and starts to advertise this cost to other nodes.

After a new node joins the network, the active network topology may be suboptimal. For example, a node already having a primary association through another existing node may be able to have a better primary association through the new joining node. That is, the hub path cost through the new node may be less, or better, than the hub path cost through the node's existing primary association. However, until the existing node detects and assesses the hub path cost of the new node, it will be unaware of the better point of association.

This scenario is particularly problematic in a network that inherently relies on beamforming to enable nodes to communicate with each other, as an existing node may not have resources (e.g., time) to dedicate to blind scanning to detect new nodes. Even if the existing node did have resources, it could take some time before the existing node is able to detect the existence of a new node, depending on how much time it can devote to blind scanning. Also, in a network where changes in topology might not be that frequent, but rapid reaction is required when they do occur, continual periodic scanning would not be an efficient use of resources.

A protocol according to the present disclosure may limit a node from blind scanning once it is associated and active, but allow efficient adaption in topology to enable it to exploit the potential to efficiently optimize its point of primary association.

In some implementations, a protocol according to the present disclosure may employ at least one of the following approaches to manage the discovery and evaluation of a new node:

Active nodes periodically scan for new nodes (as described above)

A joining node broadcasts a topology change message to nodes already in the network via a primary association it establishes A joining node sends messages directly over the air to all nodes it detects The first of these approaches is essentially passive discovery of a topology change, by scanning rather than being informed. As described above, this is suboptimal in the case of a millimeter wave system utilizing beamforming, as this could result in either lots of time spent scanning, and therefore lost time for supporting active communications, or latency in time for a network to self-optimize when a new node joins the network.

The second involves the node sending a broadcast frame out to other nodes in the network, once associated, using its primary association and relying on the receiving node to propagate this frame over the network to inform existing nodes that there is a new node in the network. This message may contain information pertinent to assisting existing nodes to evaluating this new node as a potential point of primary association (e.g. hub path cost, frequency of operation, time of broadcast beacon signal, waveform encoding information, geographic location, etc).

Message propagation needs to be managed to prevent unnecessary wide-scale flooding in the case of a large network, as it would be pointless to inform nodes several 100 s of meters away of a new 60 GHz radio node, which the distant nodes would not be able to directly communicate with over the air, due to propagation loss being too great. In some implementations, a "lifetime" (e.g. maximum hop count) can be associated with a broadcast message, with the count decremented each time the message is forwarded. Once the count reaches zero the message is discarded and does not propagate further through the network. While this is a simple approach, there is the potential for inefficiencies due to messages propagating further into the network than required, triggering nodes to scan that have zero chance of detecting the messaging node (thus wasting resources), or messages not getting to nodes due to life-time expiration that could detect the new node.

The third approach is often the most efficient and robust. Under this approach, when a new node is evaluating nodes for primary association it effectively discovers all nodes within communication range, i.e., all nodes that will be able to detect it once it starts transmitting its beacon. As in other approaches, the new node selects its primary association and calculates its hub path cost. Then, instead of advertising its existence by sending a message on the primary association, it communicates directly over the air with other nodes that it previously discovered in order to form reciprocal alternate associations. After doing so, a node receiving the alternate association proposal can evaluate if the new node can provide a better hub path cost than its existing primary association. If it can, that receiving node can switch its primary association to be to the node joining the network, instead of forming an alternate association with it. If not, then the association becomes alternate for both nodes and could be used as a primary association in the future by either node, if the current primary association fails.

Figure 8:
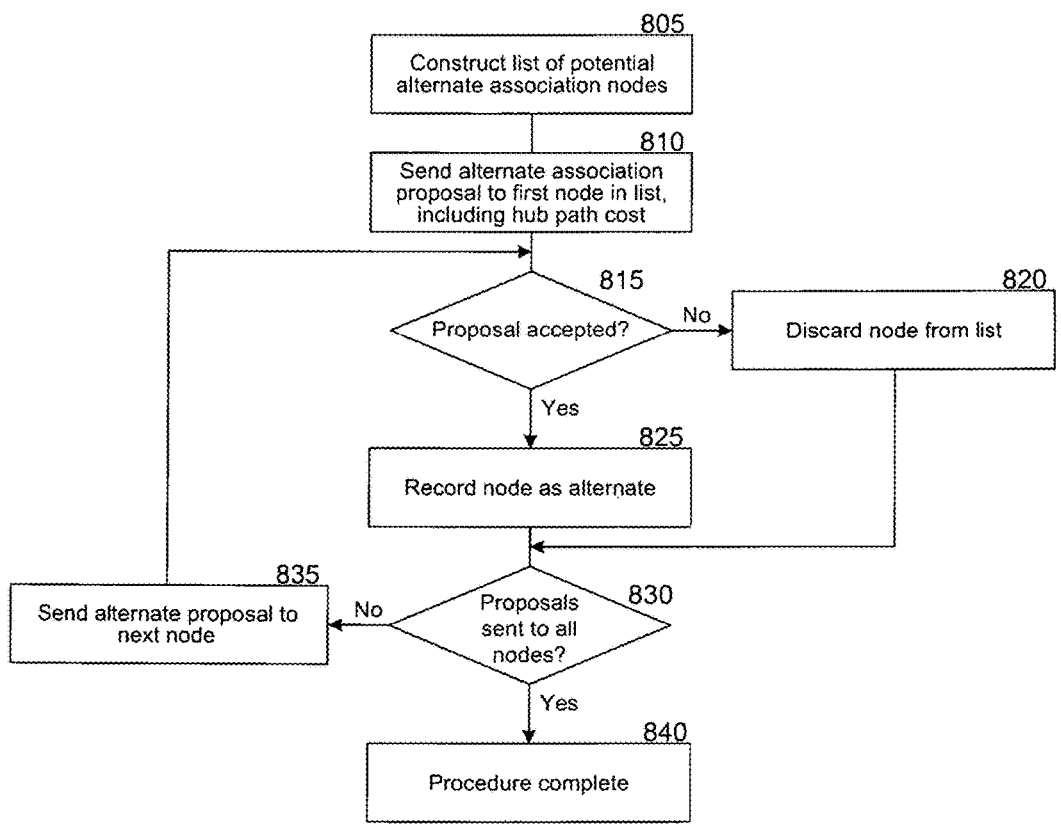
FIG. 8 is a flow diagram illustrating a procedure implemented by a new network node for identifying and forming associations with existing network nodes.
Figure 9:
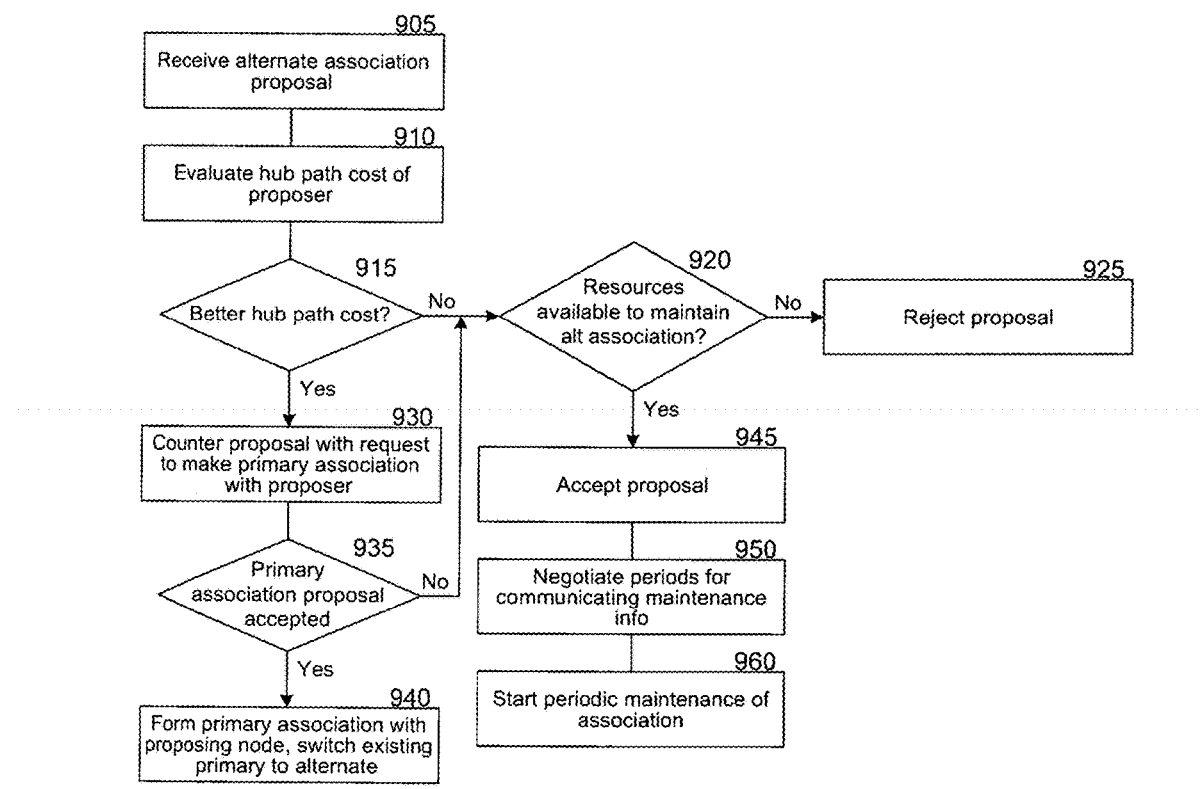
FIG. 9 is a flow diagram illustrating a procedure implemented by an existing network node for forming an association with a new network node.

FIG. 8 is a flow diagram showing example steps of this procedure from the perspective of the proposer (a new node) of an alternate association. FIG. 9 is a flow diagram showing example steps of this procedure from the perspective of the receiver (an existing node), which in turn evaluates if the proposer could provide a better primary association than the current primary associated node.

Under the procedure of FIG. 8, at a block 805, the node constructs a list of potential alternate association nodes. At a block 810, the node sends an alternate association proposal to a first node in the list. The proposal includes a hub path cost. The procedure proceeds to a decision block 815, and the node determines whether the proposal was accepted. If the proposal is not accepted, the procedure proceeds to a block 820, and the node discards the other node from the list. The procedure then proceeds to a decision block 830. If at decision block 815, the proposal is accepted, the node records the other node as an alternate at a block 825. At a decision block 830, the node determines whether proposals have been sent to all nodes. If not, the node sends alternate proposal to the next node in the list and the procedure proceeds back to decision block 815. If at decision block 830, the node determines that the proposal has been sent to all nodes, the procedure ends at a block 840.

Under the procedure of FIG. 9, at a block 905, a node receives an alternate association proposal. At a block 910, the node evaluates a hub path cost of the proposing node. At a decision block 915, the node determines whether it has a better hub path cost than the evaluated hub path cost. If not, the procedure proceeds to a decision block 920, and the node determines whether resources are available to maintain an alternate association. If not, the procedure proceeds to a block 925, and the node rejects the proposal from the proposing node. If at decision block 915 the node determines that the received hub path cost is better, the procedure proceeds to a block 930, and the node makes a counter proposal to the proposing node, requesting to make a primary association with the proposing node. At a block 935, the node determines whether the proposing node has accepted the counter proposal. If the proposing node does not accept the counter proposal, the procedure proceeds to decision block 920. If the proposing node does accept the counter proposal, the procedure proceeds to block 940, and the node forms a primary association with the proposing node, switching an existing primary association to an alternate association. Returning to decision block 920, if resources are available to maintain an alternate association, the procedure proceeds to a block 945, and the node accepts the proposal from the proposing node. At a block 950, the node negotiates periods for communicating maintenance information. At a block 960, the node starts period maintenance of the alternate association.

One substantial benefit is that this method and set of procedures enable a new node to join the network, and for existing nodes to act to optimize the topology in a distributed, dynamic manner without planning or centralized control.

While nodes may exchange frames over alternate associations for maintaining the association, no frames will be forwarded using the alternate association.

2.2.2 Controlled Node Exit

A node can leave a network either gracefully (controlled) and also abruptly (uncontrolled).

In a controlled case, such as when an operator initiates the power down of a node or a known fault is about to occur (e.g., over temperature, soft failure, etc.), the node can exit the network informing other nodes that it is going offline. In an uncontrolled case, the node cannot inform other nodes of its exit from the network, and those other nodes therefore have to detect that the exiting node is no longer available or operational.

In both cases the topology may need to adapt to heal lost primary associations. In the former case this can happen in an efficient controlled manner; in the latter case methods are needed to ensure rapid recovery and to minimize frame loss.

2.2.2.1 Controlled Node Exit

Two operations may be required when a node makes a controlled exit from a network. A first is to initiate disassociation of any nodes that have primary associations with the node exiting the network. A second is to disassociate the exiting node's primary association. In some implementations, there may be some delay between the two operations, to ensure that any frames that happen to arrive in the interim are forwarded on.

When a node intends to exit the network, it first sends a disassociation request message to the nodes that it provides the primary point of association to. The receiving nodes may respond to indicate to the exiting node whether the node exit will cause the receiving node to be orphaned (i.e., there are no alternate associations that can become primary). When a node would be orphaned, the exiting node (or operator of it) may reevaluate, depending on the reason for exiting the network.

The next step is for the nodes to respond back to indicate they are ready to switch the primary association, and an alternative hub path is ready. While waiting for the confirmation of disassociation the exiting node may continue to forward any received frames.

Once all nodes with a primary association to the exiting node have confirmed establishment of the new hub path, the exiting node can confirm its intent to exit in order to stop associated nodes from transmitting any more frames through the exiting node. It can then continue to exit the network by conducting the second procedure of disassociating its own primary association. Once this is complete the node sends a final message to the associated nodes to release the radio link, as no more frames will be pending for forwarding to them.

Figure 10:
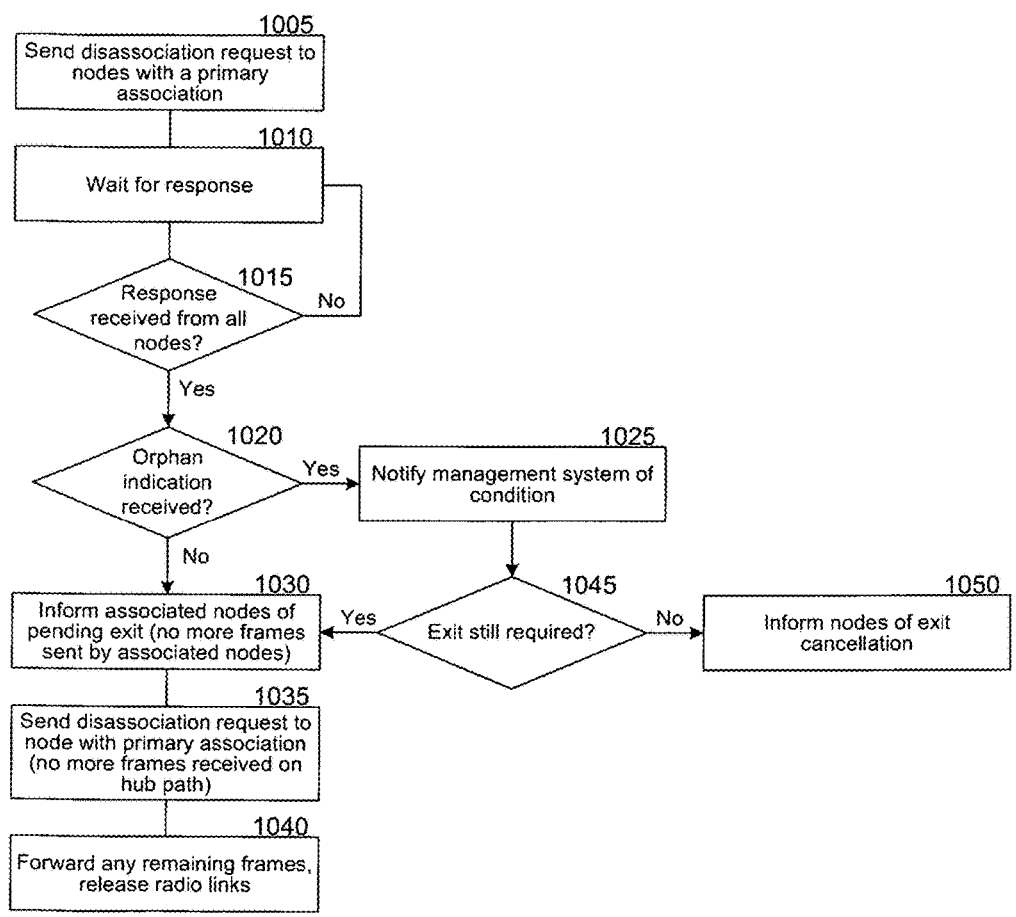
FIG. 10 is a flow diagram illustrating a procedure implemented by a node exiting a network in a controlled manner.

FIG. 10 is a flow diagram illustrating a procedure implemented by a node exiting a network. At a block 1005, the node sends a disassociation request to nodes with a primary association to the node. At a block 1010, the node waits for responses from the other nodes. At a decision block 1015, the node determines whether responses have been received from all nodes. If not, the procedure returns to block 1010. If responses have been received, the procedure proceeds to a decision block 1020, and the node determines whether an orphan indication has been received. If an orphan indication has been received, at a block 1025, the node notifies the management system of the condition. The procedure then proceeds to a decision block 1045. At decision block 1045, if the node determines that an exit is still required, the procedure proceeds to block 1030. If the node determines that an exit is not required, the procedure proceeds to block 1050, and the node informs the other nodes that its exit has been cancelled. Returning to block 1020, if no orphan indication has been received, the procedure proceeds to a block 1030. At block 1030, the node informs associated nodes of its pending exit. At a block 1035, the node sends a disassociation request to the node with a primary association. At a block 1040, the node forwards any remaining frames and releases radio links.

Figure 11:
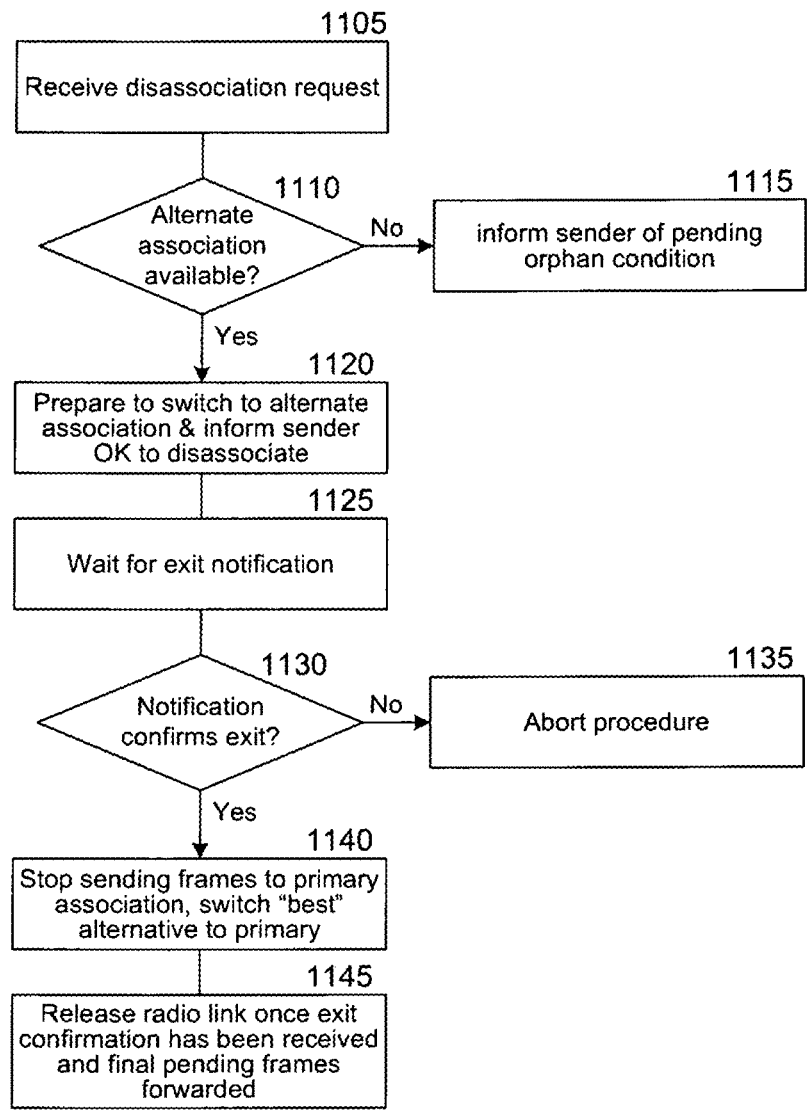
FIG. 11 is a flow diagram illustrating a procedure implemented by a node after losing its primary association due to a node exiting a network.

FIG. 11 is a flow diagram illustrating a procedure implemented by a node losing its primary association due to a node exiting a network. At a block 1105, the node receives a disassociation request from the node exiting the network. At a decision block 1110, the node determines whether alternate associations are available. If no alternate associations are available, at a block 1115, the node informs the sending node of its pending orphan condition. If an alternate association is available, at a block 1120, the node prepares to switch to the alternate association, and it informs the sender that it is okay to disassociate. At a block 1125, the node waits for an exit notification. At a decision block 1130, the node determines whether a notification has been received to confirm that the node is exiting the network. If no notification confirms the exit from the network, the procedure proceeds to a block 1135, and the node aborts the procedure. If at decision block 1130, a notification is received that confirms the node's exit, the procedure proceeds to a block 1140, and the node stops sending frames to the node with which it had a primary association. The node switches an alternate association to a primary association with a node with which it has the "best" hub path cost. At a block 1145, the node releases the radio link after the exit confirmation has been received. It then forwards any pending frames.

Figure 12:
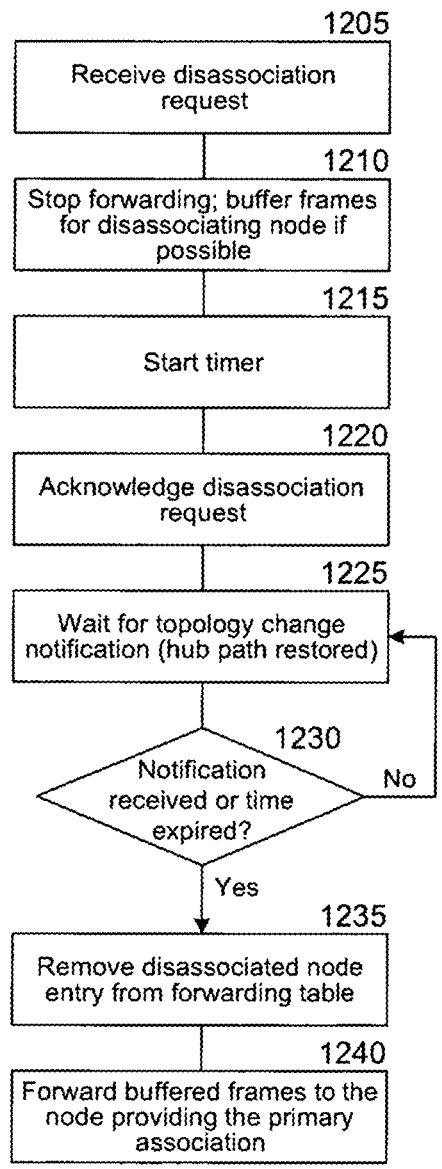
FIG. 12 is a flow diagram illustrating a procedure implemented by a node that was providing a primary association to a node exiting a network.

FIG. 12 is a flow diagram illustrating a procedure implemented by a node that was providing the primary association to a node exiting a network. At a block 1205, the node receives a disassociation request from the node exiting the network. At a block 1210, the node stops forwarding and, if possible, buffers frames for the disassociating node. At a block 1215, the node starts a timer. At a block 1220, the node acknowledges the disassociation request. At a block 1225, the node waits for a topology change notification (e.g., hub path restored). At a decision block 1230, the node determines whether a notification has been received or the timer has expired. If not, the procedure returns to block 1225. If at decision block 1230, the node determines that the notification has been received or the timer has expired, the procedure proceeds to a block 1235. At block 1235, the node removes an entry for the disassociated node from its forwarding table. At a block 1240, the node forwards buffered frames to the node providing the primary association.

2.2.2.2 Uncontrolled Node Exit

In the event of an uncontrolled exit by a node, because of, for example, a catastrophic failure (e.g. loss of power, equipment failure), the exiting node may not be able to inform nodes with primary associations to it, or the node with which it has its primary association. Associated nodes may rapidly detect a loss of their primary association by identifying any of a number of events (e.g., lack of response to requests, lack of timely acknowledgements, loss of beacon, etc.). All of these can indicate radio link failure (RLF) status in the MAC, triggering fail over for an associated node to an alternate association.

To minimize frame loss, the node providing the exiting node's primary association can buffer unacknowledged transmitted frames. Once the forwarding tables are updated and the new path is known to the destination address, then buffered frames can be forwarded on to the destination using the new path. Methods for forwarding table update following an uncontrolled node exit are described in Section 2.2.4.2.

2.2.3 Point of Primary Association Change

Point of primary association change can occur due to any of a number of events, including:

Node addition to the network, as described in Section 2.2.1
Node exits the network, as described in Section 2.2.2
Detection of a better hub path cost
Loss of primary association due to link failure The first and second events have been discussed above. The third event can occur due to a number of scenarios that are described further in this subsection.

The fourth event is may be treated in the same way as for the uncontrolled node exit scenario discussed above, except that a single point of primary association is lost. The node to which the association is lost may act in the same manner as the node that hosts the primary association of an exiting node, buffering and then forwarding frames to minimize frame loss during the period that the node that lost its primary association reconfigures its primary association.

The remainder of this subsection describes procedures for the third scenario, which can be caused, for example, by the following:

Detection of a new viable link due to a change in propagation conditions
New node joins the network
Node addition or exit further "up stream" in the tree causes the current hub path cost on the primary association to be worse than that available on an alternate association Each case is considered in further detail in the following subsections. In all cases, when a situation occurs that causes a better hub path cost to be detected by a node, then the node will change its point of primary association. It does this by either making a new association and demoting its current primary association to an alternate association, or by switching an alternate association having a better hub path cost to primary and demoting its current primary to alternate.

2.2.3.1 Detection of New Link

A new link may be detected by a node through periodic scanning using spare time intervals. In some implementations, detection of new links is assisted by information from neighboring nodes, which provide a summary of the nodes in the neighborhood and possibly information to assist in efficient detection of their beacons. The neighborhood information could be obtained by multiple means, such as through distributed approaches involving probing of nodes by requesting the node with the primary association to distribute probing messages over the neighborhood, or by collecting information in a central server that can be queried by any one node.

Once a node is in receipt of neighborhood information, it can use this to optimize a proactive attempt to detect neighborhood nodes that it does not have a primary or alternate association with. By using a proactive approach for detecting neighboring nodes, a node may identify a previously undiscovered node that has a better hub path cost than a node with which it has a primary or alternate association. For example, when joining a network, a node might only detect one other node and it may be associated with an undesirable hub path cost. Given the limited options available, the node may form a primary association with this detected node. However, a change in environment may cause an existing node to become viable. For example, rain or an object that was obscuring a link between the node and the existing node may disappear. By proactively searching for new links to existing nodes, the node can more readily find a more desirable node with which to form an association.

In summary, one method, as hinted to above, involves querying a centralized database (e.g. centralized SON server) for information about nodes in the vicinity, and neighborhood information could include location information, frequency of operation, time of beacon, etc—all of which would assist in attempting to discover an existing node.

In some implementations, a distributed approach is used, under which a node "probes" for other nodes in the neighborhood. A simple approach is to define a neighbor probe message with a limited lifespan that propagates out over the network via the primary association, with the message "hop" distance limited to prevent full network-wide propagation. This message would likely include location information and a request for all nodes receiving the message within a given distance (e.g. 100 m) to respond back with information regarding its hub path cost, beacon transmission information, and so forth. This would assist the receiving node in identifying nodes worthy of attempting to discover (e.g. better hub path cost, good hub path cost for an alternate association, etc.) and in efficiently discovering those nodes using a directed rather than blind scan.

In some implementations, a node advertises known information about a neighborhood in a beacon frame, or similar, instead of, or in addition to, using a query based mechanism.

2.2.3.2 New Network Node

The second case is when a new node joins the network, which is described in Section 2.2.1 when the node receives an alternate association proposal having a hub path cost better than the hub path cost associated with the node's current primary association.

2.2.3.3. Upstream Topology Change

The third case is caused when, due to of a change in network topology, a hub path cost associated with an alternate association is better than a hub path cost associated with a node's primary association. This may be discovered by the node through periodic monitoring of the hub path costs of the primary and alternate nodes. In this case, the node reacts by switching the point of primary association, swapping the primary and alternate states of the two associations.

2.2.4 Forwarding Table Update

After a node changes its point of primary association, the path to the hub will change and forwarding tables at intermediate nodes on the old and new path will need to be updated to remove stale entries and to ensure appropriate new entries are added.

In RSTP, a topology change notification message is used to propagate an event like this through a network. In some implementations of the present disclosure, nodes adopt a similar approach.

In some implementations, this approach is used in the case of a controlled change in the point of primary association. In some implementations, in the case of uncontrolled node exit, it is impossible for the exiting node to communicate a topology change notification and, instead, the nodes associated with the lost node can send the topology change notification. These two different cases are described in the two following subsections.

2.2.4.1 Controlled Topology Change

Once the point of primary association is changed, the node can then broadcast out a topology change notification message. In some implementations, nodes that receive this message on a connection that is not their primary association do three actions:

1) Add an entry into their forwarding table that maps the source address (SA) to the connection or port (or beam) on which the frame was received
2) Forward the message towards the hub node (upstream)
3) Forward the message on to any other nodes that it is providing the primary association for (downstream)

In some implementations, a node that receives the message on its primary association does the following three actions:

1) Removes any entry for the SA, as this is no longer the hub path
2) Forwards any buffered frames destined for SA through the primary association in the direction of the hub
3) Forwards the message on to any other nodes that it is providing the primary association for (downstream)

Figure 13:
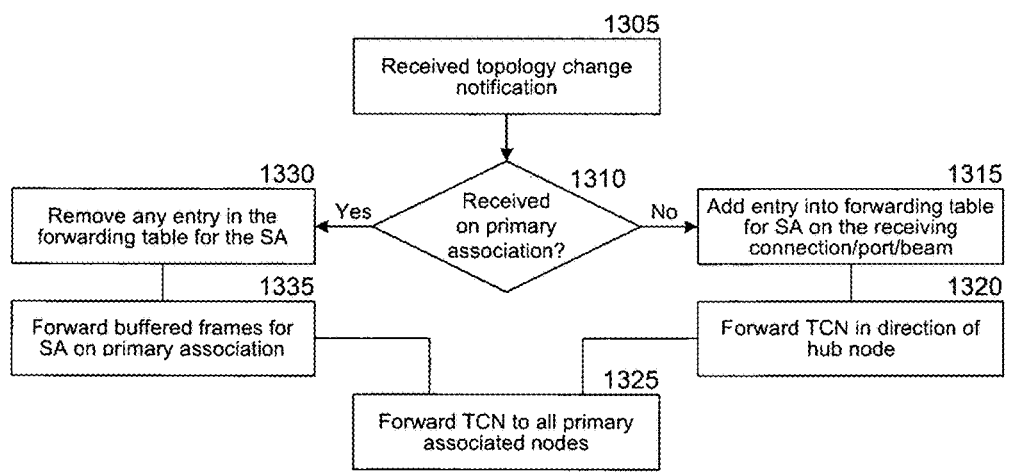
FIG. 13 is a flow diagram illustrating a procedure implemented by a node after receiving a topology change notification message from another node in a network.

FIG. 13 is a flow diagram showing a process implemented by a node after receiving a topology change notification message. The procedure implemented by the node ensures stale entries are removed if they exist on the old hub path, that new entries are added, and that any buffered frames on the old hub path are forwarded back up the tree so that eventually they reach a node on the new path for appropriate forwarding. Regarding the latter, a node that has frames that cannot be delivered, and can buffer them, can use the topology change message as an effective trigger to indicate it is safe to forward the frames back up the tree towards the hub, as a new hub path has been formed.

Under the procedure of FIG. 13, at a block 1305, the node receives a topology change notification (TCN). At a decision block 1310, the node determines whether the TCN was received on its primary association. If not, the procedure proceeds to a block 1315, and the node adds an entry in its forwarding table for the SA on the receiving connection/port/beam. At a block 1320, the node forwards the TCN in a direction of a hub node. At a block 1325, the node forwards the TCN to all nodes with a primary association with the node. Returning to decision block 1310, if the topology change notification is received on the primary association, the procedure proceeds to a block 1330, and the node removes any entry in its forwarding table for the SA. At a block 1335, the node forwards buffered frames for the SA on its primary association. The procedure then proceeds to block 1325.

As with the neighborhood probe message described earlier, the topology change notification could be a complete network wide flood, or it could have a limited hop count to limit how far such a message will propagate through the network. In reality, it only needs to be received by the nodes that formed the previous hub path, therefore the best approach is for the message to only ever propagate in the direction of the hub until an entry for the node in question is found in a forwarding table. At this point the message can then be forwarded down the old hub path to remove stale entries. Adopting this approach ensures that the topology change notification is only propagated to nodes that need to receive the information.

2.2.4.2 Uncontrolled Topology Change

In the uncontrolled case where the node exits the network, the node that hosted the primary point of association can detect an uncontrolled exit and use the topology change notification to inform other nodes on the hub path that an exit has occurred. This enables them to remove stale information from forwarding tables. This message may be time-stamped, so that should the node that exited manage to recover association to the network through another node, and the new hub path converges with the old hub path at some point, that delayed propagation of the topology change notification with uncontrolled exit information does not cause a new forwarding table entry to be subsequently deleted.

This enables a node receiving the notification with uncontrolled exit information to determine if a new forwarding table entry has occurred after the uncontrolled exit, so that it can determine if the information is current or stale, and hence persists or is removed.

2.2.5 Ensuring Topology Stability

To ensure topology stability, in some implementations, appropriately configured timers are utilized in a number of cases before certain procedures are triggered. Some examples include:

Upon detection of a better hub path cost, a timer is used to ensure it remains better for a period of time before the association is switched Upon loss of onward communication path, frames may be buffered for a period of time before they are discarded to give the network time to distribute the topology change notification (TCN) message Nodes may also monitor a particular primary association and if it is continually changing between primary and alternate, causing frequent topology changes, it may choose not to make the node with the best hub path cost the point of primary association in order to improve stability in the network. Or it may extend the duration of the timer used between detection of a node with a better hub path cost value and the point at which it acts to change the point of primary association to this node.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A non-transitory computer readable storage medium containing instructions, that when executed by a processor, perform a method in a wireless point-to-multipoint network, the method comprising:
   receiving, at a first node, a notification indicating a change in topology from a second node, the notification identifying a source address;
   determining, by the first node, whether the notification was received through a primary association;
   when the notification of the change in topology is received via a primary association with the first node, removing an entry in a forwarding table for the source address that the notification was received from;
   when the notification of the change in topology is received via an alternate association with the first node, adding an entry into the forwarding table for the source address on a receiving connection, and forwarding the notification of the change in topology in a direction of a hub node; and
   forwarding the notification of the change in topology to all nodes with which a primary association has been established with the first node.

2. The non-transitory computer readable storage medium of claim 1, wherein the method further comprises:
   detecting a failure in a link between the first node and a node that was using the first node for a primary association;
   buffering received frames that were to be transmitted to the node that was using the first node for a primary association;
   receiving information identifying a new path for transmitting frames to the node that was using the first node for a primary association; and
   transmitting the frames according to the new path for transmitting frames to the node that was using the first node for a primary association.

3. The non-transitory computer readable storage medium of claim 2, further comprising forwarding the buffered frames for the source address via the primary association when the notification of the change in topology is received via a primary association with the first node.

4. The tangible computer readable storage medium of claim 1, wherein the method further comprises:
   transmitting to a node that is using the first node for a primary association a request for information identifying nodes within a predetermined distance of the first node;
   receiving from the node that is using the first node for a primary association information identifying nodes within the predetermined distance of the first node;

transmitting to a node of the identified nodes within the predetermined distance of the first node a request for a hub path cost;

receiving from the node of the identified nodes the hub path cost;

comparing the hub path cost received from the node of the identified nodes with a hub path cost of the second node;

based at least in part on the comparison, determining to form a primary association with the node of the identified nodes;

forming a primary association with the node of the identified nodes.

5. The non-transitory computer readable storage medium of claim 1, wherein:

the second node is a new node, and the notification is proposing formation of an alternate association, and wherein the notification identifies a hub path cost associated with the new node, the method further comprising:

comparing the hub path cost associated with the new node with a hub path cost associated with a primary node with which the first node has a primary association;

determining that the hub path cost associated with the new node is less than the hub path cost associated with the primary node, transmitting, to the new node, a message that includes a request to establish a new primary association;

establishing a new primary association with the new node; and converting the primary association with the primary node into an alternate association.

6. The non-transitory computer readable storage medium of claim 5, wherein hub path cost is a composite of latency and utilization indicated as either two separate values or weighted in a single value.

7. The non-transitory computer readable storage medium of claim 1, wherein:

the notification is a dissociation request from the second node, the method further comprising:

identifying an alternate association with a third node that is available for transitioning into a primary association;

transmitting an indication to the second node that the alternate association is available;

receiving a confirmation of the dissociation request from the second node;

establishing a new primary association with the third node; and releasing a radio link associated with the primary association with the second node.

8. The non-transitory computer readable storage medium of claim 1, wherein the method further comprises:

receiving, by the first node, a request to disassociate from a node that uses the first node for a primary association;

commencing a timer upon receipt of the request to disassociate;

transmitting an acknowledgement of the request to disassociate to the node that sent the request to disassociate; and determining whether the topology change notification is received prior to an expiration of the timer.

9. A method in a wireless point-to-multipoint network, the method comprising:

receiving, at a first node, a notification indicating a change in topology from a second node, the notification identifying a source address;

determining, by the first node, whether the notification was received through a primary association;

when the notification of the change in topology is received via a primary association with the first node, removing an entry in a forwarding table for the source address that the notification was received from;

when the notification of the change in topology is received via an alternate association with the first node, adding an entry into the forwarding table for the source address on a receiving connection, and forwarding the notification of the change in topology in a direction of a hub node; and forwarding the notification of the change in topology to all nodes with which a primary association has been established with the first node.

10. The method of claim 9, wherein the second node is a new node, and the notification is proposing formation of an alternate association, and wherein the notification identifies a hub path cost associated with the new node, the method further comprising:

comparing the hub path cost associated with the new node with a hub path cost associated with a primary node with which the first node has a primary association;

determining that the hub path cost associated with the new node is less than the hub path cost associated with the primary node, transmitting, to the new node, a message that includes a request to establish a new primary association;

establishing a new primary association with the new node; and converting the primary association with the primary node into an alternate association.

11. The method of claim 10, wherein hub path cost is a composite of latency and utilization indicated as either two separate values or weighted in a single value.

12. The method of claim 9, wherein the notification is a dissociation request from the second node, the method further comprising:

identifying an alternate association with a third node that is available for transitioning into a primary association;

transmitting an indication to the second node that the alternate association is available;

receiving a confirmation of the dissociation request from the second node;

establishing a new primary association with the third node; and releasing a radio link associated with the primary association with the second node.

13. The method of claim 9, wherein the method further comprises:

receiving, by the first node, a request to disassociate from a node that uses the first node for a primary association;

commencing a timer upon receipt of the request to disassociate;

transmitting an acknowledgement of the request to disassociate to the node that sent the request to disassociate; and determining whether the topology change notification is received prior to an expiration of the timer.

14. The method of claim 9, further comprising:

detecting a failure in a link between the first node and a node that was using the first node for a primary association;

buffering received frames that were to be transmitted to the node that was using the first node for a primary association;

receiving information identifying a new path for transmitting frames to the node that was using the first node for a primary association; and transmitting the frames according to the new path for transmitting frames to the node that was using the first node for a primary association.

15. The method of claim 14, further comprising forwarding the buffered frames for the source address via the primary association when the notification of the change in topology is received via a primary association with the first node.

16. The method of claim 9, further comprising:
transmitting to a node that is using the first node for a primary association a request for information identifying nodes within a predetermined distance of the first node;
receiving from the node that is using the first node for a primary association information identifying nodes within the predetermined distance of the first node;
transmitting to a node of the identified nodes within the predetermined distance of the first node a request for a hub path cost;
receiving from the node of the identified nodes the hub path cost;
comparing the hub path cost received from the node of the identified nodes with a hub path cost of the second node;
based at least in part on the comparison, determining to form a primary association with the node of the identified nodes;
forming a primary association with the node of the identified nodes.

17. A system, comprising:
a first node including a memory and one or more processors in communication with the memory, the one or more processors to:
receive a notification indicating a change in topology from a second node, the notification identifying a source address;
determine whether the notification was received through a primary association;
when the notification of the change in topology is received via a primary association with the first node, remove an entry in a forwarding table for the source address that the notification was received from;
when the notification of the change in topology is received via an alternate association with the first node, add an entry into the forwarding table for the source address on a receiving connection, and forward the notification of the change in topology in a direction of a hub node; and
forward the notification of the change in topology to all nodes with which a primary association has been established with the first node.

18. The system of claim 17, wherein the second node is a new node, and the notification is proposing formation of an alternate association, and wherein the notification identifies a hub path cost associated with the new node, and wherein the one or more processors are further configured to:
compare the hub path cost associated with the new node with a hub path cost associated with a primary node with which the first node has a primary association;
determine that the hub path cost associated with the new node is less than the hub path cost associated with the primary node, transmit, to the new node, a message that includes a request to establish a new primary association;
establish a new primary association with the new node; and
convert the primary association with the primary node into an alternate association.

19. The system of claim 18, wherein hub path cost is a composite of latency and utilization indicated as either two separate values or weighted in a single value.

20. The system of claim 17, wherein the notification is a dissociation request from the second node, and wherein the one or more processors are further configured to:
identify an alternate association with a third node that is available for transitioning into a primary association;
transmit an indication to the second node that the alternate association is available;
receive a confirmation of the dissociation request from the second node;
establish a new primary association with the third node; and
release a radio link associated with the primary association with the second node.

21. The system of claim 17, wherein the one or more processors are further configured to:
receive, by the first node, a request to disassociate from a node that uses the first node for a primary association;
commence a timer upon receipt of the request to disassociate;
transmit an acknowledgement of the request to disassociate to the node that sent the request to disassociate; and
determine whether the topology change notification is received prior to an expiration of the timer.

22. The system of claim 17, wherein the one or more processors are further configured to:
detect a failure in a link between the first node and a node that was using the first node for a primary association;
buffer received frames that were to be transmitted to the node that was using the first node for a primary association;
receive information identifying a new path for transmitting frames to the node that was using the first node for a primary association; and
transmit the frames according to the new path for transmitting frames to the node that was using the first node for a primary association.

23. The system of claim 22, wherein the one or more processors are further configured to forward the buffered frames for the source address via the primary association when the notification of the change in topology is received via a primary association with the first node.

24. The system of claim 17, wherein the one or more processors are further configured to:
transmit to a node that is using the first node for a primary association a request for information identifying nodes within a predetermined distance of the first node;
receive from the node that is using the first node for a primary association information identifying nodes within the predetermined distance of the first node;
transmit to a node of the identified nodes within the predetermined distance of the first node a request for a hub path cost;
receive from the node of the identified nodes the hub path cost;
compare the hub path cost received from the node of the identified nodes with a hub path cost of the second node;

based at least in part on the comparison, determine to form a primary association with the node of the identified nodes;

form a primary association with the node of the identified nodes.

* * * * *